US012794766B2

(12) United States Patent
Deng et al.

(10) Patent No.: US 12,794,766 B2
(45) Date of Patent: Nov. 10, 2026

(54) MULTI-AZ ARBITRATION SYSTEM AND METHOD

(71) Applicant: Huawei Cloud Computing Technologies Co., Ltd., Guizhou (CN)

(72) Inventors: Zhijie Deng, Gui'an (CN); Yunzhou Zheng, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 15 days.

(21) Appl. No.: 19/094,160

(22) Filed: Mar. 28, 2025

(65) Prior Publication Data

US 2025/0227023 A1 Jul. 10, 2025

Related U.S. Application Data

(63) Continuation of application No. PCT/CN2023/118081, filed on Sep. 11, 2023.

(30) Foreign Application Priority Data

Sep. 30, 2022 (CN) ........................ 202211216479.3

(51) Int. Cl.

*H04L 41/0686* (2022.01)
*H04L 67/10* (2022.01)
*H04L 67/52* (2022.01)

(52) U.S. Cl.

CPC .......... *H04L 41/0686* (2013.01); *H04L 67/10* (2013.01); *H04L 67/52* (2022.05)

(58) Field of Classification Search

CPC ..... H04L 41/0686; H04L 67/10; H04L 67/52; H04L 41/40; H04L 43/10; H04L 41/0894;

(Continued)

(56) References Cited

U.S. PATENT DOCUMENTS 10,445,197 B1 * 10/2019 Harpreet ............. G06F 11/2023
2017/0054700 A1 * 2/2017 Brown .................. G06Q 30/04

(Continued)

FOREIGN PATENT DOCUMENTS

CN 110750393 A 2/2020

OTHER PUBLICATIONS

Heidari Parisa et al, "QoS Assurance with Light Virtualization—A Survey" IEEE International Conference on Cloud Computing Technology and Science (CLOUDCOM), IEEE, Dec. 12, 2016, pp. 558-563, XP033049777.

*Primary Examiner* — Benjamin M Thieu
(74) *Attorney, Agent, or Firm* — Conley Rose, P.C.

(57) ABSTRACT

The arbitration system includes an arbitration module and M AZs. Each AZ includes a detection module and a plurality of service nodes. M is an integer greater than 2. The M AZs are configured to: run at least one application and provide at least one service for each application. The detection module in each AZ is configured to send detection information to the arbitration module. The arbitration module is configured to: receive an arbitration policy configured by a user and detection information from M detection modules; and determine network states between the M AZs based on the detection information of the M detection modules, and determine, based on the network states and the arbitration policy, an AZ in which a primary node that provides each service for an application of the user is located and an AZ in which a secondary node is located.

20 Claims, 12 Drawing Sheets

(58) Field of Classification Search
CPC .. H04L 69/40; G06F 11/2028; G06F 11/2038; G06F 11/2048; G06F 13/16; G06F 13/1605
See application file for complete search history.

(56) References Cited

U.S. PATENT DOCUMENTS

| | | | |
|---|---|---|---|
| 2021/0247996 A1 | 8/2021 | Onai et al. | |
| 2021/0297398 A1 * | 9/2021 | Gupta | G06F 9/45558 |
| 2024/0073093 A1 * | 2/2024 | Fang | G07C 5/008 |

* cited by examiner

MULTI-AZ ARBITRATION SYSTEM AND METHOD

CROSS-REFERENCE TO RELATED APPLICATIONS

This is a continuation of International Patent Application No. PCT/CN2023/118081 filed on Sep. 11, 2023, which claims priority to Chinese Patent Application No. 202211216479.3 filed on Sep. 30, 2022, both of which are hereby incorporated by reference in their entireties.

TECHNICAL FIELD

This application relates to the field of cloud computing technologies, and in particular, to a multi-AZ arbitration system and method.

BACKGROUND

A public cloud core region includes a plurality of availability zones (AZs). Each AZ includes an independent equipment room, ventilation, fire prevention, plumbing and drainage, and electricity, a network device, a server device, and the like. The AZs are interconnected through an optical fiber. With continuous expansion of cloud resources, to provide users with high-reliable services, public cloud service providers usually construct services (such as password services, storage services, and computing services) of the public cloud service providers based on an architecture of a plurality of AZs, and recommend the users to construct, across the AZs, services included in applications of the users. Refer to FIG. 1A. An AZ 1, an AZ 2, an AZ 3, and an AZ 4 each include a service node (or may be referred to as a service instance) 1 and a service node 2. The service node 1 is configured to provide data of a service 1 or data of a backup service 1 for an application of a user. The service node 2 is configured to provide data of a service 2 or data of a backup service 2 for the application of the user. The user (which may also be referred to as a tenant below) may construct an application architecture of the user in at least one of the four AZs, that is, deploy a primary node and a secondary node that provide a service for the application of the user. For example, an application of a tenant includes a service 1 and a service 2. The tenant may deploy the service node 1 in the AZ 1 as a primary node of the service 1, deploy the service node 1 in the AZ 2 as a secondary node of the service 1, deploy the service node 2 in the AZ 2 as a primary node of the service 2, and deploy the service node 2 in the AZ 1 as a secondary node of the service 2.

In a multi-AZ scenario, AZs can send a heartbeat packet to each other to detect whether a primary node in each AZ can provide a service for an application (APP) of the user. For example, if the AZ 1 does not receive a heartbeat packet from at least one AZ in other AZs within specified time, it is considered that a primary node in the at least one AZ cannot provide a service for the application of the user, and a secondary node in the AZ 1 is promoted to the primary node to provide the service for the application of the user, to ensure that the application of the user is available. However, in actual application, a reason why the AZ 1 does not receive the heartbeat packet from the at least one AZ within the specified time may be that a network between the AZ 1 and the at least one AZ is faulty, but actually the at least one AZ may provide a service for the application of the user. In this case, both the AZ 1 and the at least one AZ may provide the service for the application of the user. This is considered as that split-brain occurs between the AZ 1 and the at least one AZ. For example, refer to FIG. 1B. “T1-APP” represents an application of a tenant (T) 1, “T1-APP-primary” represents a primary node that provides a service for the application of the tenant 1, and “T1-APP-secondary” represents a secondary node that backs up data for the application of the tenant 1. If the AZ 2 does not receive a heartbeat packet from the AZ 1 within specified time, a node “T1-APP-secondary” in the AZ 2 may be promoted to “T1-APP-primary” to provide the service for the application of the tenant 1. In this case, a node “T1-APP-primary” in the AZ 1 also provides the service for the application of the tenant 1. It can be learned that split-brain occurs between the AZ 1 and the AZ 2. In this case, because the AZ 1 and the AZ 2 cannot communicate with each other, a data inconsistency may occur between nodes corresponding to the application of the tenant 1 in the AZ 1 and the AZ 2.

Therefore, how to reduce a probability of split-brain between AZs to ensure high reliability of a service is still an important problem to be urgently resolved.

SUMMARY

Embodiments of this application provide a multi-AZ arbitration system and method, to reduce a probability of split-brain between AZs, thereby ensuring high reliability of a service.

According to a first aspect, a multi-AZ arbitration system is provided. The arbitration system includes an arbitration module and M AZs, each AZ includes a detection module and a plurality of service nodes, and M is an integer greater than 2. The M AZs are configured to: run at least one application and provide at least one service for each application, each service includes a primary node and a secondary node, and the primary node and the secondary node in each service are deployed in different AZs. The detection module in each AZ is configured to send detection information to the arbitration module, where the detection information indicates a status of receiving and/or sending data by the detection module in each AZ. The arbitration module is configured to: receive an arbitration policy configured by a user and detection information from M detection modules, where the arbitration policy indicates priorities of AZs that provide each service for an application of the user; and determine network states between the M AZs based on the detection information of the M detection modules, and determine, based on the network states and the arbitration policy, an AZ in which a primary node that provides each service for the application of the user is located and an AZ in which a secondary node is located.

In an embodiment of this application, the arbitration module determines, based on the network states between the M AZs, the AZ in which the primary node that provides each service for the application of the user is located and the AZ in which the secondary node is located, to implement system-level arbitration on the M AZs. This can reduce a probability that two AZs provide a service for the application of the user at the same time. In other words, this can reduce a probability that split-brain occurs between the AZs. In addition, the AZs in which the primary node and the secondary node of the services are located determined by the arbitration module based on the arbitration policy configured by the user better meet a requirement of the user.

In a possible design, the network states indicate that networks between a first AZ in the M AZs and remaining AZs in the M AZs are all faulty. The arbitration module is configured to: determine N AZs from the remaining AZs, where a primary node that provides a first service for the application of the user exists in the first AZ, a secondary node of the first service exists in the N AZs, and N is a positive integer; and determine, based on a priority that is of an AZ of the first service and that is included in the arbitration policy, that a second AZ in the N AZs is upgraded to a primary AZ of the first service.

In other words, when an AZ cannot communicate with other AZs, it indicates that the AZ may be faulty, and a primary node that is of the AZ and that provides a service for the user cannot continue to provide the service. Therefore, an AZ may be selected from the other AZs, and a secondary node of the service in the selected AZ is promoted to the primary node to provide the service, to help ensure availability of the application.

In a possible design, the network states indicate that a network between a first AZ in the M AZs and a second AZ in the M AZs is faulty, and a network between the first AZ and a third AZ in the M AZs is normal. The arbitration module is configured to: determine whether an application of a first user exists, where a primary node that provides a first service for the application of the first user exists in the first AZ, a primary node that provides a second service for an application of a second user exists in the second AZ, and no node of the application of the first user exists in an AZ other than the first AZ and the second AZ in the M AZs; and if the application of the first user exists, a priority that is of an AZ of the first service and that is included in the arbitration policy indicates that a priority of the first AZ is higher than a priority of the second AZ, and a priority that is of an AZ of the second service and that is included in the arbitration policy indicates that the priority of the first AZ is higher than the priority of the second AZ, determine that the first AZ is a primary AZ of the first service and the second service; or if the application of the first user exists, a priority that is of an AZ of the first service and that is included in the arbitration policy indicates that a priority of the first AZ is higher than a priority of the second AZ, and a priority that is of an AZ of the second service and that is included in the arbitration policy indicates that the priority of the second AZ is higher than the priority of the first AZ, randomly determine the first AZ or the second AZ as a primary AZ of the first service and the second service.

In other words, when an application of a user is deployed only in two AZs, and a network between the two AZs is faulty, one AZ may be used to provide a service for the application of the user, to reduce data inconsistency and help improve service reliability.

According to a second aspect, a multi-AZ arbitration method is provided, applied to the multi-AZ arbitration system according to the first aspect. The multi-AZ arbitration system includes M AZs and an arbitration module, each AZ includes a detection module and a plurality of service nodes, and M is an integer greater than 2. The method includes: running at least one application and providing at least one service for each application by using the M AZs, where each service includes a primary node and a secondary node, and the primary node and the secondary node in each service are deployed in different AZs; sending detection information to the arbitration module by using the detection module in each AZ, where the detection information indicates a status of receiving and/or sending data by each detection module; and receiving, by using the arbitration module, an arbitration policy configured by a user and detection information from M detection modules, where the arbitration policy indicates priorities of AZs that provide each service for an application of the user, determining network states between the M AZs based on the detection information of the M detection modules, and determining, based on the network states and the arbitration policy, an AZ in which a primary node that provides each service for the application of the user is located and an AZ in which a secondary node is located.

In a possible design, the network states indicate that networks between a first AZ in the M AZs and remaining AZs in the M AZs are all faulty. The determining, based on the network states and the arbitration policy, an AZ in which a primary node that provides each service for the application of the user is located and an AZ in which a secondary node is located includes: determining N AZs from the remaining AZs by using the arbitration module, where a primary node that provides a first service for the application of the user exists in the first AZ, a secondary node of the first service exists in the N AZs, and N is a positive integer; and determining, by using the arbitration module based on a priority that is of an AZ of the first service and that is included in the arbitration policy, that a second AZ in the N AZs is upgraded to a primary AZ of the first service.

In a possible design, the network states indicate that a network between a first AZ in the M AZs and a second AZ in the M AZs is faulty, and a network between the first AZ and a third AZ in the M AZs is normal. The determining, based on the network states and the arbitration policy, an AZ in which a primary node that provides each service for the application of the user is located and an AZ in which a secondary node is located includes: determining, by using the arbitration module, whether an application of a first user exists, where a primary node that provides a first service for the application of the first user exists in the first AZ, a primary node that provides a second service for an application of a second user exists in the second AZ, and no node of the application of the first user exists in an AZ other than the first AZ and the second AZ in the M AZs; and if the application of the first user exists, a priority that is of an AZ of the first service and that is included in the arbitration policy indicates that a priority of the first AZ is higher than a priority of the second AZ, and a priority that is of an AZ of the second service and that is included in the arbitration policy indicates that the priority of the first AZ is higher than the priority of the second AZ, determining, by using the arbitration module, that the first AZ is a primary AZ of the first service and the second service; or if the application of the first user exists, a priority that is of an AZ of the first service and that is included in the arbitration policy indicates that a priority of the first AZ is higher than the priority of the second AZ, and a priority that is of an AZ of the second service and that is included in the arbitration policy indicates that the priority of the second AZ is higher than the priority of the first AZ, randomly determining, by using the arbitration module, the first AZ or the second AZ as a primary AZ of the first service and the second service.

According to a third aspect, a computer-readable storage medium is provided. The computer-readable storage medium is configured to store a computer program. When the computer program is run on a computer, the computer is enabled to perform the method according to the second aspect.

According to a fourth aspect, a computer program product is provided, including a computer program. When the computer program is run on a computer, the computer is enabled to perform the method according to the second aspect.

According to a fifth aspect, a chip system is provided, including a processor and an interface. The processor is configured to invoke instructions from the interface and run the instructions, to enable the chip system to implement the method according to the second aspect.

For beneficial effects of the second aspect to the fifth aspect, refer to beneficial effects of the first aspect. Details are not described again.

DESCRIPTION OF EMBODIMENTS

Figure 1A:
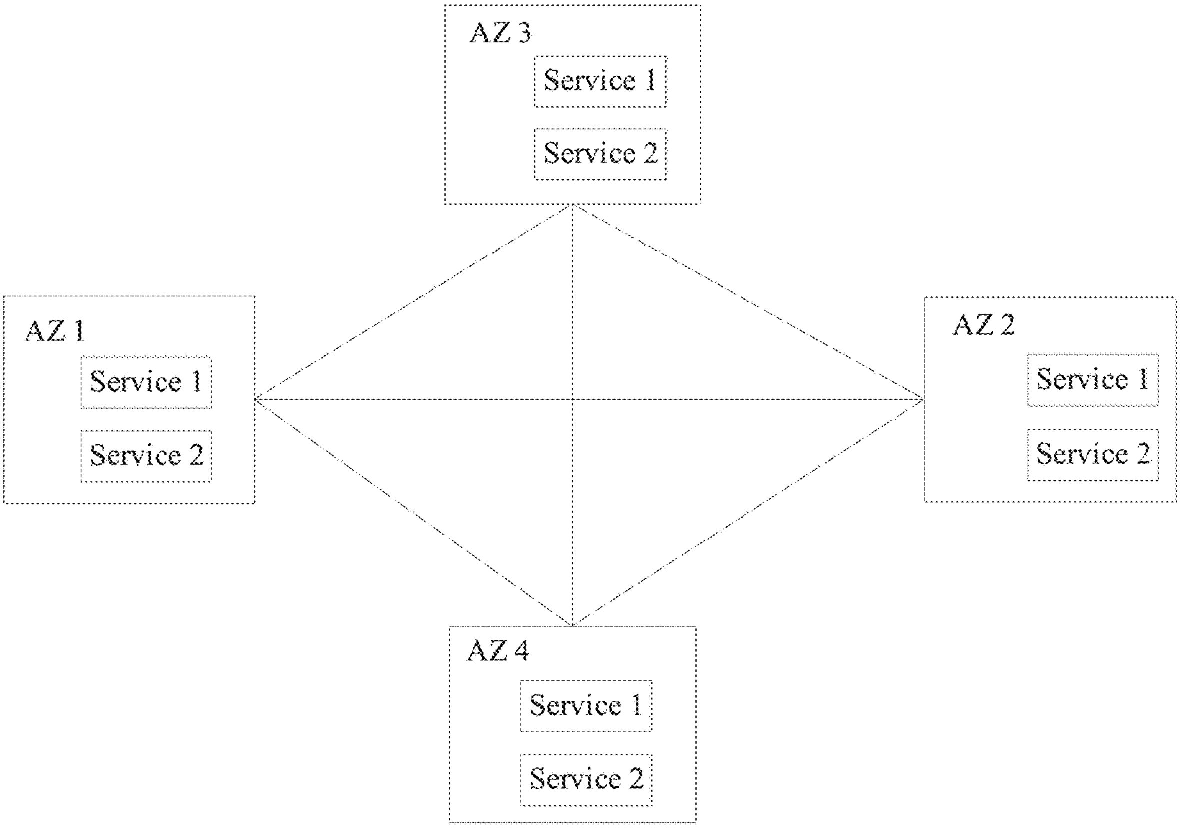
FIG. 1A is a diagram of a multi-AZ scenario.
Figure 1B:
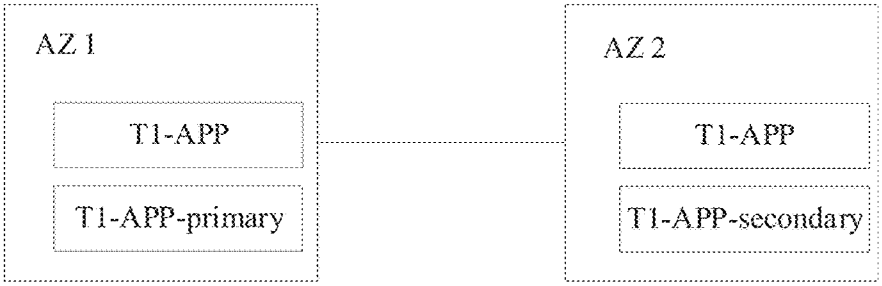
FIG. 1B is a diagram of another multi-AZ scenario.

The following first describes some terms in embodiments of this application. It should be noted that these descriptions are for ease of understanding by persons skilled in the art, and are not intended to limit the protection scope claimed in embodiments of this application.

1. A region is divided from dimensions of a geographical location and network latency. Public services, such as elastic computing, block storage, object storage, virtual private cloud (VPC), elastic Internet Protocol (EIP), and a mirror, are shared within a same region. The region is classified into a common region and a dedicated region. The common region is a region that provides common cloud services for public users. The dedicated region is a region that carries only a same type of services or provides services only for specific users. Generally, one or more hosts (for example, a host may be used as a node) may be deployed in the same region to provide one or more services.

2. An AZ is a collection of one or more physical data centers and has independent ventilation, fire prevention, plumbing and drainage, and electricity. In one AZ, resources, such as computing, network, and storage, can be logically divided into a plurality of clusters. AZs within one region are interconnected via high-speed optical fibers to meet a requirement of a user for building a high-performance application across the AZs. Generally, one or more hosts may be deployed in a same AZ to provide at least one service. The user is, for example, a provider of the application.

If an application of the user requires only one service, when the user constructs an architecture of the application across AZs, a node in an AZ may be used as a primary node that provides a service for the application of the user, and a node that is in another AZ and that can provide the service may be used as a secondary node to back up data. Alternatively, if an application used by the user needs a plurality of services, when the user constructs an architecture of the application across AZs, at least one node in an AZ may be used as a primary node that provides at least one service for the application of the user, and one node provides one service; and a node that is in another AZ and that can provide the at least one service may be used as a secondary node to back up data. When an application of the user may need a plurality of services, primary nodes of different services may be located in a same AZ or located in different AZs. For example, a plurality of services required by an application of a user include a password service, a storage service, and a computing service. When the user constructs an architecture of the application across AZs, a node 1 in an AZ 1 may be used as a primary node that provides the password service for the application of the user, a node 2 in the AZ 1 may be used as a primary node that provides the storage service for the application of the user, and a node that is in another AZ and that can provide the password service and the storage service for the application of the user may be used as a secondary node. In addition, a node 3 in an AZ 2 may be used as a primary node that provides the computing service for the application of the user, and a node that is in another AZ and that can provide the computing service for the application of the user may be used as a secondary node.

3. Primary/Secondary state:

(1) Indicates a primary/secondary state of a node, where the primary/secondary state of the node may be specific to a service, a primary node is a node used for providing a service, and a secondary node is a node used for backing up data.

(2) Indicates a primary/secondary state of an AZ, where the primary/secondary state of the AZ may be specific to a service or may be specific to an application of a user. For example, if the primary/secondary state of the AZ is specific to the service, for a service of an application, a primary AZ of the service means that a node that is in the AZ and that can provide the service for the application is a primary node, and a secondary AZ of the service means that a node that is in the AZ and that can provide the service for the application is a secondary node. If the primary/secondary state of the AZ is specific to the application, for an application, a primary AZ of the application means that all nodes that are in the AZ and that can provide a service for the application are primary nodes, and a secondary AZ of the application means that all nodes that are in the AZ and that can provide the service for the application are secondary nodes.

The following describes the technical solutions in embodiments of this application with reference to the accompanying drawings in embodiments of this application. The terms "system" and "network" may be used interchangeably in embodiments of this application. "At least one" means one or more, and "a plurality of" means two or more. The term "and/or" is an association relationship for describing associated objects and represents that three relationships may exist. For example, A and/or B may represent the following three cases: Only A exists, both A and B exist, and only B exists, where A and B may be singular or plural. The character "/" generally indicates an "or" relationship between the associated objects. At least one (piece) of the following items or a similar expression thereof refers to any combination of these items, including a single item (piece) or any combination of plural (pieces) of items. For example, at least one item (piece) of a, b, or c may indicate: a, b, c, a and b, a and c, b and c, or a, b, and c, where a, b, and c may be singular or plural.

Unless otherwise specified, ordinal numbers such as "first" and "second" mentioned in embodiments of this application are used to distinguish a plurality of objects, and are not used to limit a sequence, a time sequence, a priority, or an importance degree of the plurality of objects.

In addition, the terms "include" and "have" in embodiments of this application, the claims, and the accompanying drawings are not exclusive. For example, a process, a method, a system, a product, or a device that includes a series of steps or modules is not limited to the listed steps or modules, and may further include steps or modules that are not listed.

Figure 2:
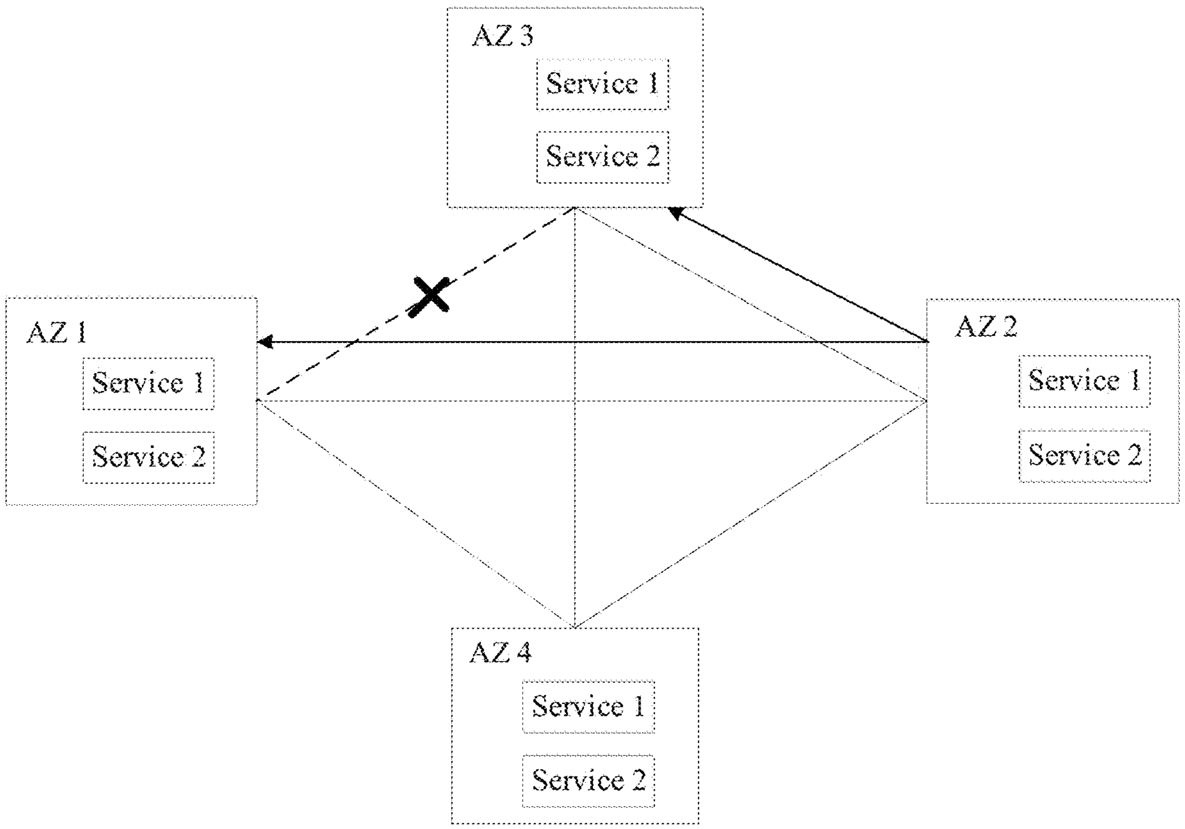
FIG. 2 is a diagram of restoring a network connection between AZs.

As mentioned above, in a multi-AZ scenario, if a network between AZs is interrupted, split-brain may occur between the AZs. Currently, to avoid the split-brain between the AZs in the multi-AZ scenario, a communication connection between two AZs is generally restored in a manner of standby router rerouting. For example, refer to FIG. 2. When an AZ 1 does not receive a heartbeat packet from an AZ 3 within specified time, to avoid split-brain between the AZ 1 and the AZ 3, a communication connection between the AZ 1 and the AZ 3 may be restored through a standby route between the AZ 1 and an AZ 2 and between the AZ 2 and the AZ 3. As a result, a bandwidth resource may need to be reserved for the standby route, and network costs are high.

In view of this, an embodiment of this application provides a multi-AZ arbitration system. In the arbitration system, an arbitration module may determine, based on received detection information and an arbitration policy configured by a user, an AZ in which a primary node in each service is located and an AZ in which a secondary node in each service is located, and no bandwidth resource may need to be reserved, thereby reducing network costs.

Figure 3:
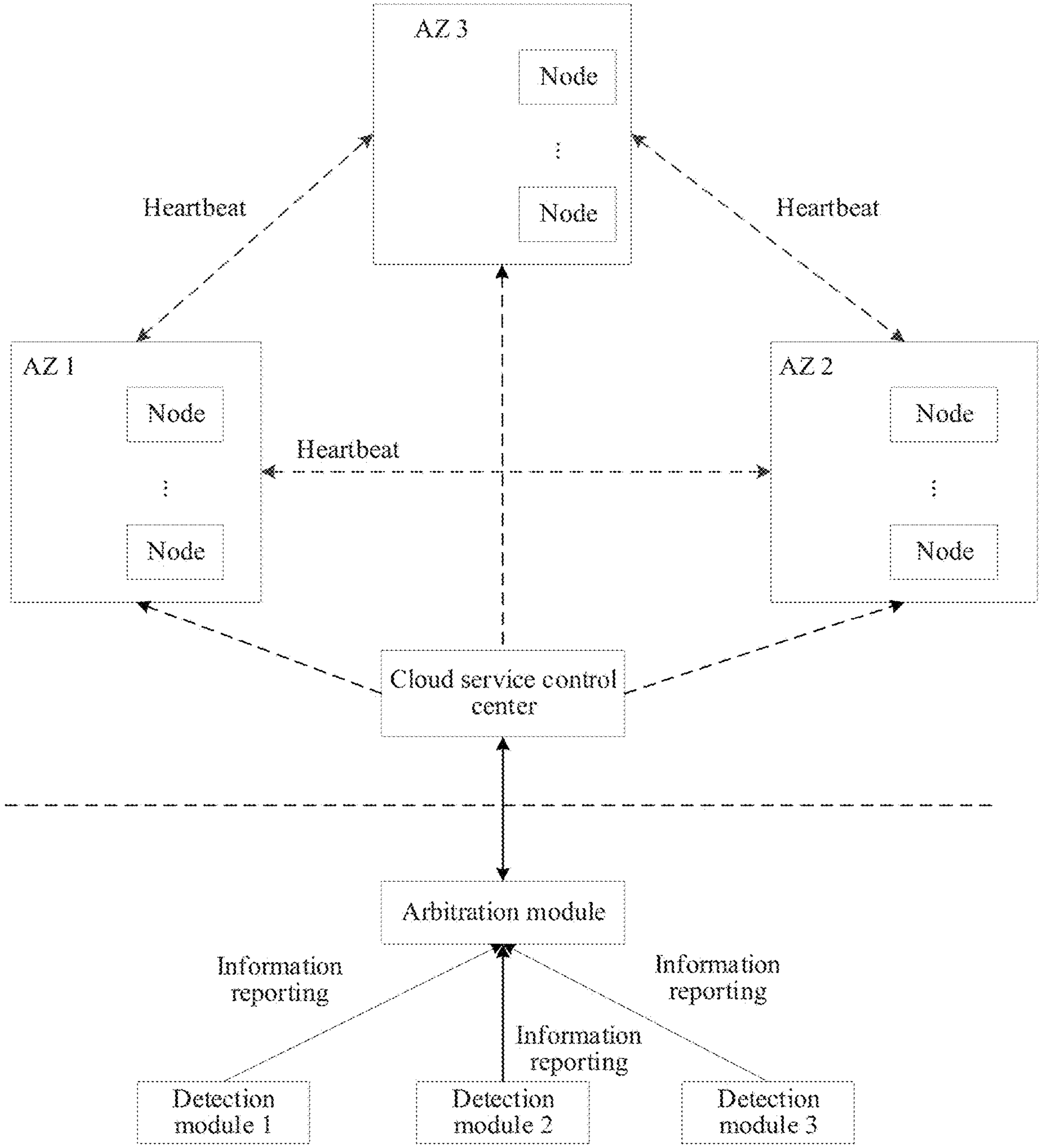
FIG. 3 is a diagram of an application scenario to which an embodiment of this application is applicable.

FIG. 3 is a diagram of an application scenario to which an embodiment of this application is applicable. In the application scenario, three AZs are used as an example.

FIG. 3 includes an arbitration module, a cloud service control center, three AZs, three detection modules, and user equipment (UE). Each of the three AZs may include a plurality of service nodes (for example, a node is a physical data center described above) and a detection module. For example, an AZ 1 includes a detection module 1, an AZ 2 includes a detection module 2, and an AZ 3 includes a detection module 3. For ease of description, the detection module is not placed in a corresponding AZ in FIG. 3.

At least one application runs in the AZ 1, the AZ 2, and the AZ 3, and the AZ 1, the AZ 2, and the AZ 3 may provide at least one service for each application. Each service corresponds to one primary node and at least one secondary node, and the primary node and the at least one secondary node are located in different AZs. For example, an application 1 runs in the AZ 1 and the AZ 2, and the application 1 includes a service 1 and a service 2. A primary node corresponding to the service 1 is a node 1 in the AZ 1, and a secondary node is a node 1 in the AZ 2. A primary node corresponding to the service 2 is a node 2 in the AZ 2, and a secondary node is a node 2 in the AZ 1.

Every two of the AZ 1, the AZ 2, and the AZ 3 are connected to each other, for example, via optical fibers or network cables. The AZ 1, the AZ 2, and the AZ 3 can back up data through connections to each other. The detection module 1, the detection module 2, and the detection module 3 may send heartbeat packets through full-mesh ping between the AZs to perform data exchange. The full-mesh ping is that, for example, the detection module 1, the detection module 2, and the detection module 3 may send heartbeat packets to each other through connections between the AZs. For example, any one of the three detection modules may send heartbeat packets to the other two detection modules, and the detection module may further receive heartbeat packets from the other two detection modules. Optionally, each of the AZ 1, the AZ 2, and the AZ 3 may be connected to the arbitration module. The detection module 1, the detection module 2, and the detection module 3 may send received and/or sent heartbeat packets to the arbitration module. The arbitration module may determine network states between the AZ 1, the AZ 2, and the AZ 3 based on the received heartbeat packets. Optionally, a data backup manner between the AZ 1, the AZ 2, and the AZ 3 may be synchronous replication. For example, when a node in the AZ 1 provides a service, a corresponding node in the AZ 2 and/or a corresponding node in the AZ 3 may back up data in real time, so that when the AZ 1 is faulty, the corresponding node in the AZ 2 and/or the corresponding node in the AZ3 may continue to provide the service, to prevent service interruption. To implement the synchronous replication, a medium connection with a high transmission speed such as an optical fiber may be provided between AZs. In addition, a distance between any two AZs in the AZ 1, the AZ 2, and the AZ 3 may be within a specified distance (for example, 100 kilometers (km)). For example, the AZ 1, the AZ 2, and the AZ 3 are placed in a same city.

A user may register an AZ required by an application of the user to the cloud service control center by using the UE, and the cloud service control center may obtain, based on registration information of the user, information about an application architecture constructed by the user. For example, the UE may output a corresponding console management interface via a display screen, and the user may input or select a registration information parameter in a related attribute configuration item of the console management interface based on an application requirement of the user, to complete information registration. The registration information parameter includes, for example, parameters such as an identifier of a node, an Internet Protocol (IP) address of the node, an AZ to which the node belongs, and a primary/secondary state of the node. Optionally, when the user performs registration by using the UE, an arbitration policy may be further configured. The arbitration policy may indicate, when a network is faulty, priorities of AZs that provide each service for the application of the user. For example, an application 1 of a user 1 includes a service 1 and a service 2. A primary node corresponding to the service 1 is the node 1 in the AZ 1, and a secondary node is the node 1 in the AZ 2. A primary node corresponding to the service 2 is the node 2 in the AZ 2, and a secondary node is the node 2 in the AZ 1. An arbitration policy configured by the user 1 is that a priority of an AZ corresponding to the service 1 is that a priority of the AZ 1 is higher than a priority of the AZ 2, and a priority of an AZ corresponding to the service 2 is that the priority of the AZ 1 is higher than the priority of the AZ 2.

The arbitration module may receive detection information from the detection module 1, the detection module 2, and the detection module 3. The arbitration module may determine, based on the detection information, the network states between the AZs. The arbitration module may obtain, from the cloud service control center, the arbitration policy configured by the user, and determine, based on the network states and the arbitration policy, an AZ in which a primary node that provides each service for the application of the user is located and an AZ in which a secondary node is located. For example, both the AZ 1 and the AZ 2 include an application 1 of a user 1, and the application 1 includes a service 1 and a service 2. If the arbitration module determines, based on received detection information, that a network between the AZ 1 and the AZ 2 is faulty, it indicates that primary/secondary arbitration between the AZs may need to be performed. The arbitration module may determine, based on an arbitration policy configured by the user 1, a primary AZ corresponding to the service 1 and a primary AZ corresponding to the service 2. In the foregoing example, the arbitration module determines, based on the arbitration policy configured by the user 1, that the AZ 1 is an AZ in which a primary node of the service 1 and a primary node of the service 2 are located, and the AZ 2 is an AZ in which a secondary node of the service 1 and a secondary node of the service 2 are located.

After determining a primary AZ that provides the service 1 and the service 2 for the application 1 of the user 1, the arbitration module may further send an arbitration result to the cloud service control center, and the cloud service control center may perform primary/secondary switchover on a corresponding node in the AZ based on the arbitration result. Alternatively, the arbitration module may not need to send the arbitration result to the cloud service control center, and the arbitration module performs the primary/secondary switchover on the corresponding node in the AZ. If this manner is used, the cloud service control center may not be included in this scenario. The arbitration module may be disposed independently of the AZ 1, the AZ 2, and the AZ 3. Alternatively, the arbitration module may be deployed in any AZ, for example, may be a node in an AZ. Alternatively, the arbitration module may be deployed in the cloud service control center. The arbitration module may be configured to implement an arbitration mechanism in embodiments of this application. The arbitration module may be a software module, or may be implemented by using hardware, for example, implemented by using a server. A product form of the arbitration module is not limited in embodiments of this application.

After receiving the arbitration result from the arbitration module, the cloud service control center may perform the primary/secondary switchover on the corresponding node in the AZ based on the arbitration result. For example, if the arbitration result of the arbitration module on the AZ 1, the AZ 2, and the AZ 3 is that the AZ 1 is promoted as the primary AZ of the application of the user 1, the cloud service control center may switch a secondary node corresponding to the application of the user 1 in the AZ 1 to a primary node.

Based on the foregoing content, the following describes a multi-AZ arbitration system and method provided in embodiments of this application with reference to the accompanying drawings of this specification.

The multi-AZ arbitration system provided in embodiments of this application includes M AZs and an arbitration module, each AZ includes a detection module and a plurality of service nodes, and M is an integer greater than 2. The service node is, for example, a server.

Figure 4A:
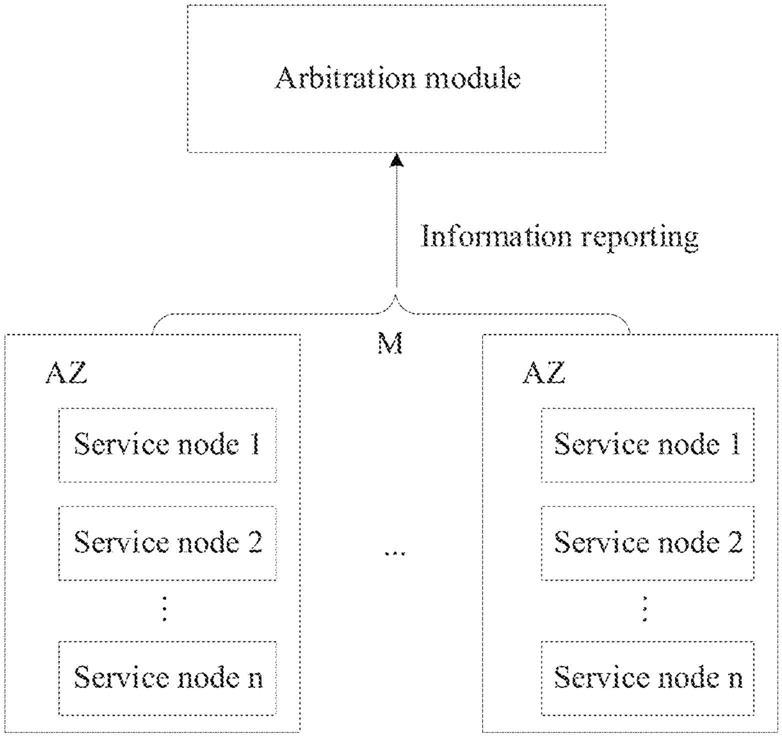
FIG. 4A to FIG. 4C are diagrams of structures of a plurality of multi-AZ arbitration systems according to an embodiment of this application.
Figure 4B:
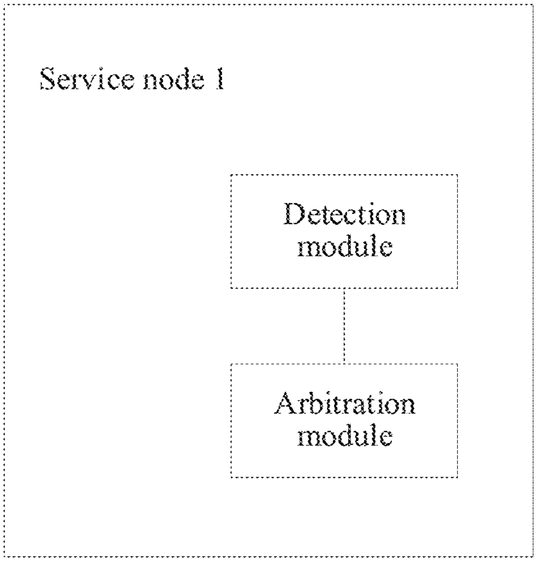
Figure 4C:
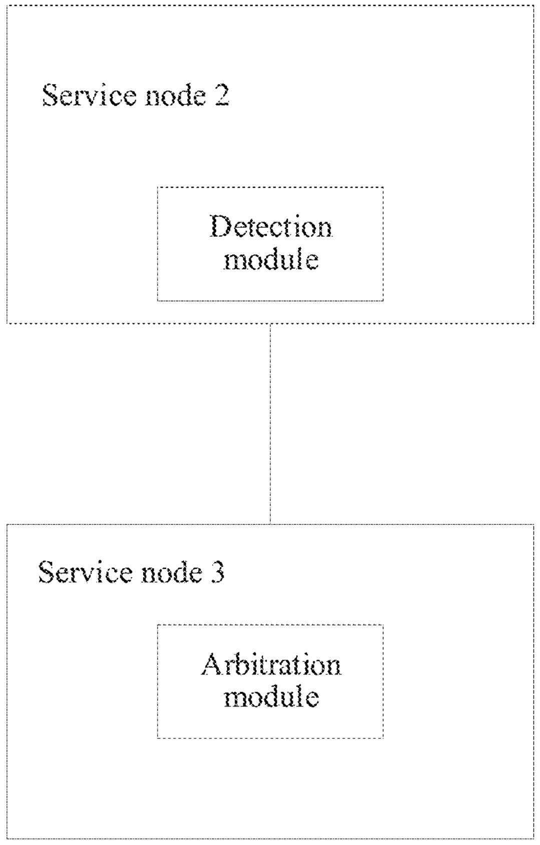

Optionally, the detection module may be a hardware apparatus in an AZ, for example, a service node in the plurality of service nodes, or may be a software module running on a service node. Alternatively, the arbitration module may be a hardware apparatus, or may be a software module running on a hardware apparatus. The arbitration module may be disposed independently of the M AZs. Alternatively, the arbitration module may be deployed in any AZ, for example, may be a service node in an AZ. Refer to FIG. 4A, FIG. 4B, and FIG. 4C. FIG. 4A, FIG. 4B, and FIG. 4C are respectively diagrams of structures of three arbitration systems according to an embodiment of this application. In FIG. 4A, both a detection module and an arbitration module are hardware apparatuses, the arbitration module is disposed independently of the M AZs (where every two of the M AZs are connected to each other), and the detection module is one of the plurality of service nodes, for example, may be a service node 2 in an AZ. In FIG. 4B, a detection module and an arbitration module are software modules running on a service node in an AZ. In FIG. 4C, a detection module and an arbitration module respectively run on a service node 1 and a service node 2 in different AZs. The service node 1 and the service node 2 may be communicatively connected, and the detection module may send information to the arbitration module through a connection between the service node 2 and the service node 3.

At least one application may run in the M AZs, and at least one service may be provided for the application. Nodes of each service include a primary node and a secondary node. The primary node is configured to provide the service, and the secondary node is configured to back up data for the service. The primary node and the secondary node may be service nodes, or may be virtual nodes running on a service node. The primary node and the secondary node in each service are located in different AZs. For example, a service 1 includes one primary node and two secondary nodes, and the three nodes are located in three different AZs.

The detection module in each AZ may send data to a detection module in another AZ, receive data from the detection module in the another AZ, obtain detection information based on the received and/or sent data, and send the detection information to the arbitration module. The arbitration module may determine, based on detection information from M detection modules, network states between the M AZs, and determine, based on the network states and the arbitration policy configured by the user, an AZ in which a primary node that provides each service for the application of the user is located and an AZ in which a secondary node is located.

Figure 5:
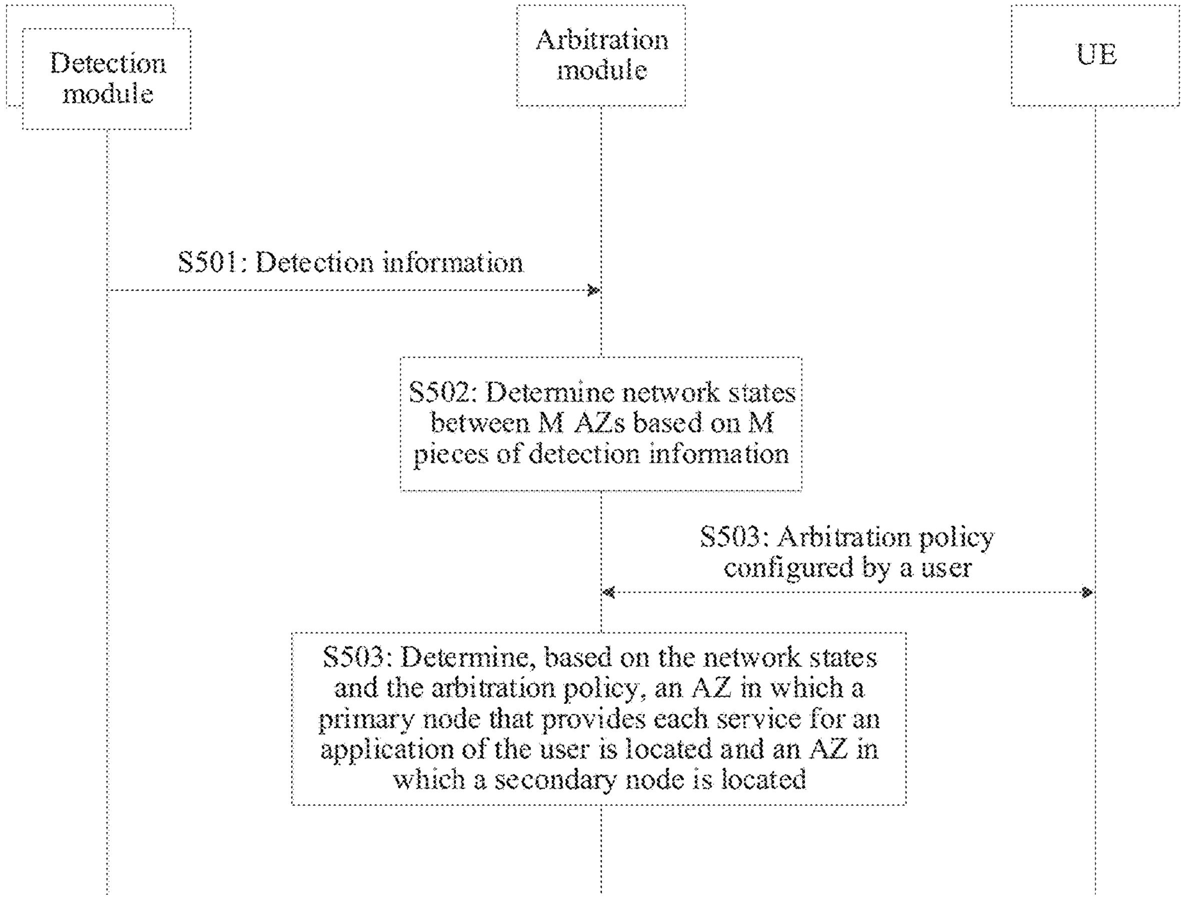
FIG. 5 is a schematic flowchart of a multi-AZ arbitration method according to an embodiment of this application.

After the arbitration system is described, the following describes the detection module and the arbitration module in FIG. 4A to FIG. 4C in detail by using a flowchart of a multi-AZ arbitration method shown in FIG. 5.

S501: Each detection module sends detection information to an arbitration module. Correspondingly, the arbitration module receives the detection information from each detection module.

Any detection module in M detection modules may send heartbeat packets to remaining M−1 detection modules at an interval of specified time. In addition, the detection module may further receive heartbeat packets from the M−1 detection modules. Optionally, any detection module in the M detection modules may further obtain detection information based on the sent heartbeat packets and/or the received heartbeat packets, and send the detection information to the arbitration module. For example, the detection module may record content of the received heartbeat packets and/or the sent heartbeat packets. Optionally, the detection module may further record transmission (for example, receiving or sending) time of each heartbeat packet, and/or record a transmission path of each heartbeat packet. Information recorded by the detection module may be used as the detection information obtained by the detection module.

S502: The arbitration module determines network states between M AZs based on M pieces of detection information.

After receiving the M pieces of detection information from the M detection modules, the arbitration module may determine the network states between the M AZs based on the M pieces of detection information. For example, the arbitration module may determine a quantity of heartbeat packets included in each piece of detection information, and determine the network states between the M AZs based on the quantity of heartbeat packets. For example, one piece of detection information in the M pieces of detection information is first detection information, the first detection information is from a first detection module in the M detection modules, and the first detection module is deployed in a first AZ. For example, if a quantity of heartbeat packets included in the first detection information is 2*(M−1), it may be considered that the first detection information includes M−1 heartbeat packets sent by the first detection module to the remaining M−1 detection modules, and includes M−1 heartbeat packets received by the first detection module from the M−1 detection modules. This indicates that networks between the first AZ and remaining M−1 AZs are normal. Alternatively, if the quantity of heartbeat packets included in the first detection information is less than 2*(M−1), it indicates that the first detection module does not receive a heartbeat packet from a detection module. In this case, the arbitration module may determine, based on a transmission path of the heartbeat packet included in the first detection information, that the first detection module does not receive a heartbeat packet from a second detection module. In this case, the arbitration module may determine that a network between the first AZ and an AZ to which the second detection module belongs is abnormal. Alternatively, the arbitration module may determine the network states between the M AZs based on another parameter included in the detection information. This is not limited herein.

For example, M=4. The M AZs are respectively an AZ 1 to an AZ 4. Network states between the four AZs that are determined by the arbitration module may be represented in a corresponding form, and are described below by using an example.

In a first form: If networks between the four AZs are normal, for the network states between the four AZs that are determined by the arbitration module, reference may be made to Table 1.

TABLE 1

| | AZ 1 | AZ 2 | AZ 3 | AZ 4 |
|---|---|---|---|---|
| AZ 1 | / | Normal (Normal) | Normal | Normal |
| AZ 2 | Normal | / | Normal | Normal |
| AZ 3 | Normal | Normal | / | Normal |
| AZ 4 | Normal | Normal | Normal | / |

Normal indicates that a network state between two AZs is normal.

Figure 6:
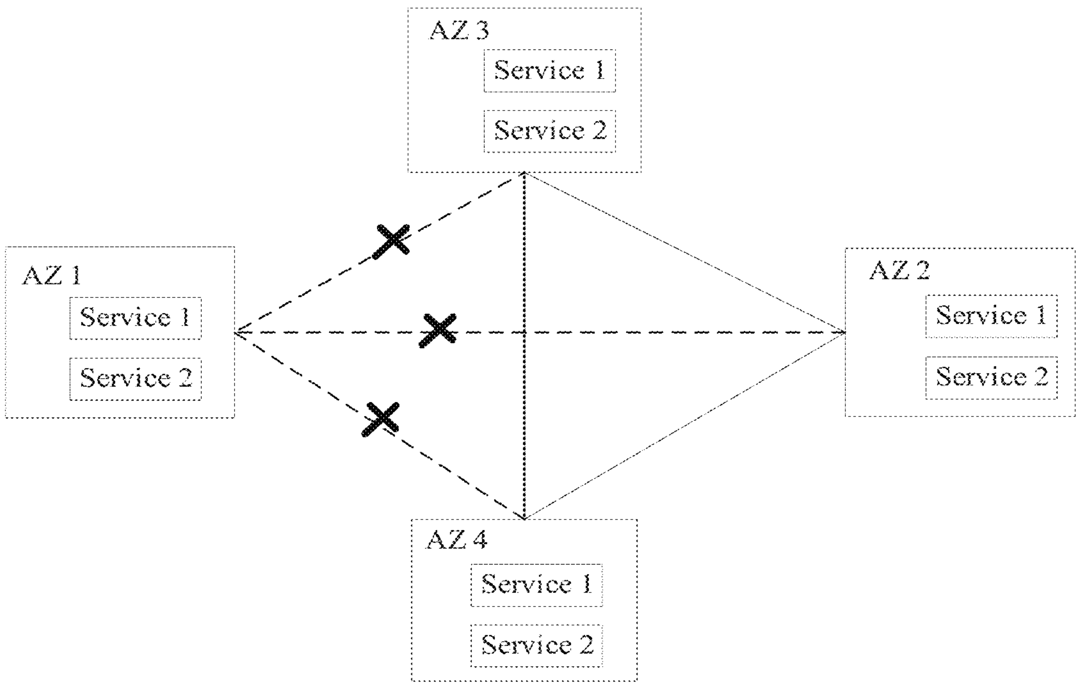
FIG. 6 to FIG. 9 are diagrams of a plurality of network fault scenarios according to an embodiment of this application.

In a second form: Networks between a first AZ (for example, the AZ 1) and three remaining AZs in the four AZs are faulty. For this, refer to FIG. 6. For network states between the AZ 1 to the AZ 4 shown in FIG. 6, reference may be made to Table 2.

TABLE 2

| | AZ 1 | AZ 2 | AZ 3 | AZ 4 |
|---|---|---|---|---|
| AZ 1 | NG | Abnormal (Abnormal) | Abnormal | Abnormal |
| AZ 2 | Abnormal | / | Normal | Normal |
| AZ 3 | Abnormal | Normal | / | Normal |
| AZ 4 | Abnormal | Normal | Normal | / |

Abnormal indicates that a network between two AZs is abnormal or the network is faulty. NG indicates that an AZ is faulty, for example, an equipment room of the AZ 1 is powered off. In this scenario, the AZ 1 cannot communicate with the other three AZs. In this case, it is considered that the AZ 1 is isolated.

In a third form: A network between a first AZ (for example, the AZ 1) and a second AZ (for example, the AZ 2) in the four AZs is faulty, and a network between the first AZ and a third AZ (for example, the AZ 3) is normal. In this case, the network states between the four AZs may further include the following two cases.

Figure 7:
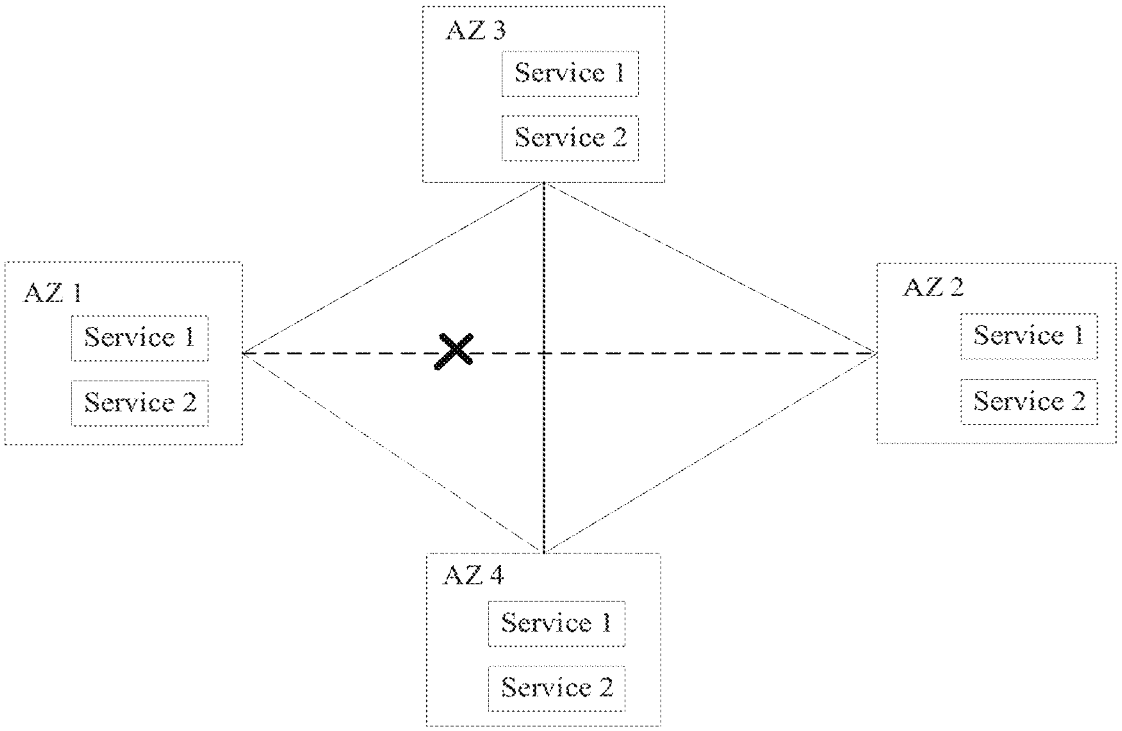

Case 1: Refer to FIG. 7. A network between the AZ 1 and the AZ 2 is faulty, networks between the AZ 1 and the AZ 3 and between the AZ 1 and the AZ 4 are normal, and networks between the AZ 2 and the AZ 3 and between the AZ 2 and the AZ 4 are normal. For network states between the AZ 1 to the AZ 4 shown in FIG. 7, reference may be made to Table 3.

TABLE 3

| | AZ 1 | AZ 2 | AZ 3 | AZ 4 |
|---|---|---|---|---|
| AZ 1 | / | Abnormal | Normal | Normal |
| AZ 2 | Abnormal | / | Normal | Normal |
| AZ 3 | Normal | Normal | / | Normal |
| AZ 4 | Normal | Normal | Normal | / |

Figure 8:
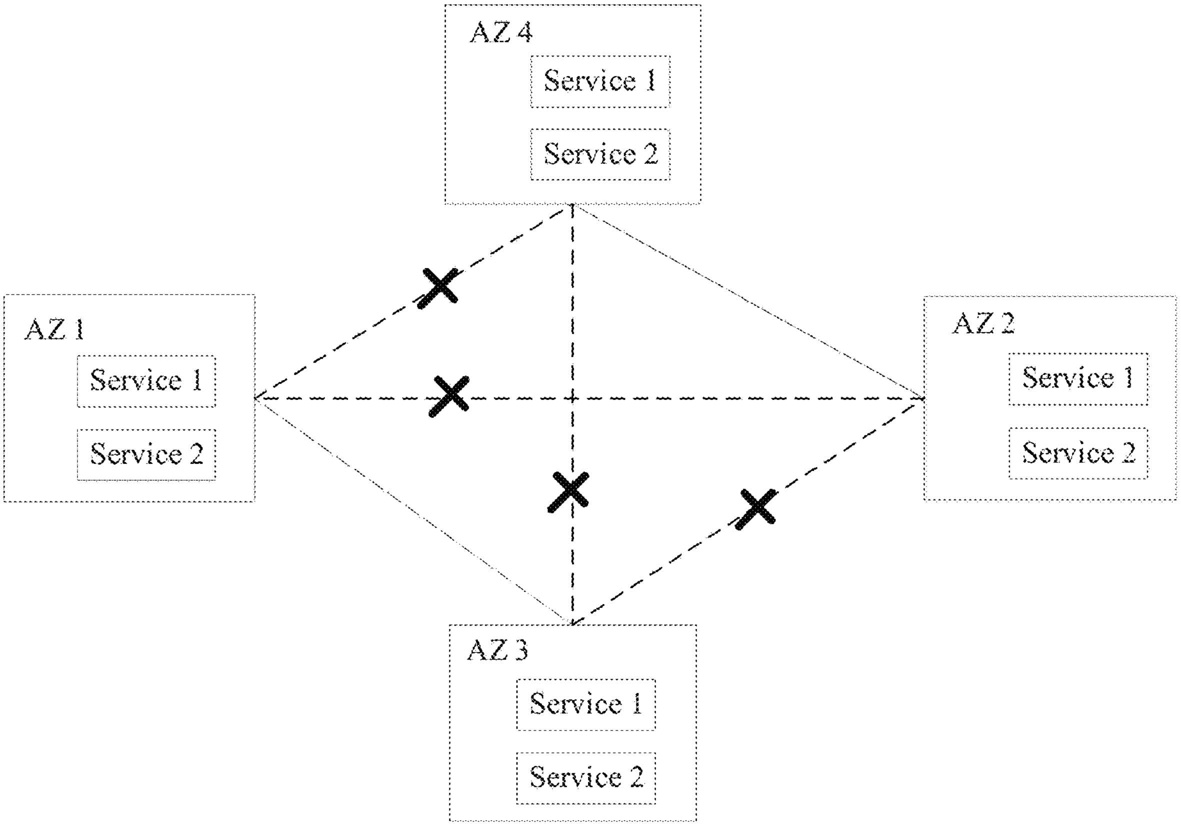

Case 2: Refer to FIG. 8. Networks between the AZ 1 and the AZ 2 and between the AZ 1 and the AZ 4 are faulty, a network between the AZ 1 and the AZ 3 is normal, a network between the AZ 2 and the AZ 4 is normal, and a network between the AZ 2 and the AZ 3 is faulty. For network states between the AZ 1 to the AZ 4 shown in FIG. 8, refer to Table 4.

TABLE 4

| | AZ 1 | AZ 2 | AZ 3 | AZ 4 |
|---|---|---|---|---|
| AZ 1 | / | Abnormal | Normal | Abnormal |
| AZ 2 | Abnormal | / | Abnormal | Normal |
| AZ 3 | Normal | Abnormal | / | Abnormal |
| AZ 4 | Abnormal | Normal | Abnormal | / |

S503: The arbitration module receives an arbitration policy configured by a user, and determines, based on the network states and the arbitration policy, an AZ in which a primary node that provides each service for an application of the user is located and an AZ in which a secondary node is located.

The arbitration policy may be received by the arbitration module from the cloud service control center after the arbitration module sends a request to the cloud service control center shown in FIG. 3, or may be directly sent by the user by using the UE.

When the arbitration module determines that a network between two AZs is faulty, it indicates that split-brain may occur between the two AZs. In this case, to reduce a probability that the split-brain occurs between the two AZs, the arbitration module may need to perform AZ arbitration.

Optionally, when determining that a network between two AZs is faulty, the arbitration module may obtain application architecture information of the user from the cloud service control center shown in FIG. 3. The application architecture information may indicate AZs in which nodes that provide services for an application of a user are respectively located. The arbitration module may determine, based on the application architecture information, whether the two AZs include nodes that can provide a service for an application of a same user (in the following embodiment, AZs including nodes that provide a service for an application of a user is referred to as the AZs including an application of a user). If the two AZs do not include the application of the same user, when a network between the two AZs is faulty, even though the two AZs cannot communicate with each other, two nodes do not provide a same service for the application of the same user, and no split-brain occurs between the two AZs. Therefore, the arbitration module may not perform primary/secondary arbitration on the two AZs. Alternatively, if the two AZs include the application of the same user, it indicates that when a network between the two AZs is faulty, split-brain may occur. Therefore, the arbitration module may need to perform the primary/secondary arbitration on the two AZs. Optionally, if the two AZs include applications of a plurality of same users, the arbitration module may separately determine a primary AZ and a secondary AZ of an application of each same user in the applications of the plurality of same users, that is, separately perform arbitration. For example, both the two AZs include an application of a user 1 and an application of a user 2. The arbitration module may determine that one of the two AZs is the primary AZ of the application of the user 1, and the other AZ is the secondary AZ of the application of the user 1, and determine that the other AZ is the primary AZ of the application of the user 2, and the AZ is the secondary AZ of the application of the user 2. Alternatively, the arbitration module may uniformly determine the primary AZ and the secondary AZ of the applications of the plurality of same users, that is, perform unified arbitration, for example, determine that one of the two AZs is the primary AZ of the application of the user 1 and the application of the user 2, and the other AZ is the secondary AZ of the application of the user 1 and the application of the user 2.

Optionally, the application architecture information obtained by the arbitration module from the cloud service control center may be application architecture information of a user included in one of the two AZs, or application architecture information of a user included in each of the two AZs, or application architecture information of all users included in all AZs corresponding to a current region. For example, the current region includes three AZs: AZ-1, AZ-2, and AZ-3, and the two AZs are AZ-1 and AZ-2. AZ-1 includes an application of a user A and an application of a user B, AZ-2 includes an application of a user C, and AZ-1 and AZ-2 do not include an application of a same user. Even though AZ-1 and AZ-2 cannot communicate with each other, two nodes do not provide a same service for the application of the same user at the same time. Therefore, when performing primary/secondary arbitration between the AZs based on the network states, the arbitration module may further obtain application architecture information of users (for example, the user A and the user B, and/or the user C) included in the AZ-1 and/or the AZ-2, or application architecture information of all users included in the AZ-1, the AZ-2, and the AZ-3.

Optionally, a same user may construct application architectures of one or more applications in AZs of a same region. If a user constructs a plurality of application architectures in the AZs of the same region, the arbitration module may separately perform primary/secondary arbitration between the AZs based on different applications of the user. In the following embodiment, an example in which a same user constructs an application architecture of one application in AZs of a region is used.

The following describes, based on the several network states in S502, a process in which the arbitration module performs AZ arbitration based on the application architecture information of the user and the arbitration policy configured by the user.

In a first network state, networks between the M AZs are normal, as described in the first form described in S502.

If the networks between the four AZs are normal, it indicates that each AZ can provide a service normally and AZ arbitration is not needed.

In a second network state, the first AZ is isolated by the remaining M−1 AZs in the M AZs, and the first AZ cannot communicate with the M−1 AZs, as described in the second form described in S502.

When the first AZ (for example, the AZ 1) is isolated, it may indicate that a fault occurs in the AZ 1 (for example, an equipment room of the AZ 1 is powered off). In this case, a primary node that provides a service in the AZ 1 cannot continue to provide the service. The arbitration module may obtain, from the cloud service control center, application architecture information of the user included in the AZ 1, and determine, based on the application architecture information of the user, AZs in which a primary node included in the AZ 1 and a secondary node corresponding to the primary node are located. For example, if the AZ 1 includes only a primary node that provides a service 1 for an application 1 of a user 1, the arbitration module may determine, from the remaining three AZs based on application architecture information of the application 1, N AZs that include a secondary node corresponding to the service 1, where N is a positive integer.

The arbitration module may determine, from the N AZs based on an arbitration policy configured by the user 1, a primary AZ that provides the service 1. For example, the N AZs include an AZ 2 and an AZ 3. In the arbitration policy configured by the user, a priority of an AZ corresponding to the service 1 is that a priority of the AZ 2 is higher than a priority of the AZ 3. The arbitration module determines that the AZ 2 is the primary AZ corresponding to the service 1 of the application 1, and the AZ 3 and the AZ 1 are secondary AZs corresponding to the service 1 of the application 1. It may be understood that if the AZ 3 includes a primary node that provides a service 2 for the application 1, a primary AZ and a secondary AZ corresponding to the service 2 are not needed to be arbitrated. Optionally, when N=1, the arbitration module directly determines that the AZ is an AZ in which the primary node of the service 1 is located, and determines that the AZ 1 is an AZ in which the secondary node of the service 1 is located.

If the AZ 1 includes primary nodes of services of applications of a plurality of users, the arbitration module may determine, from the remaining M−1 AZs based on application architecture information of each user and an arbitration policy configured by each user, an AZ in which a primary node of a service of each application is located and an AZ in which a secondary node is located. For example, the AZ 1 includes a primary node of a service 1 and a primary node of a service 2, where the service 1 is a service included in an application 1 of a user 1, and the service 2 is a service included in an application 2 of a user 2. The arbitration module determines, based on application architecture information of the application 1, that the AZ 2 includes a secondary node of the service 1. The arbitration module may upgrade the secondary node in the AZ 2 to the primary node of the service 1, and downgrade the primary node of the service 1 in the AZ 1 to the secondary node of the service 1. In addition, the arbitration module determines, based on application architecture information of the application 2, that two AZs include secondary nodes of the service 2. The arbitration module may upgrade, based on a priority that is of the service 2 and that is in arbitration policy configured by the user 2, the secondary node of the service 2 in an AZ with a higher priority to the primary node of the service 2, and downgrade the primary node of the service 2 in the AZ 1 to the secondary node.

In a third network state, a network between the first AZ and a second AZ in the M AZs is faulty, and a network between the first AZ and a third AZ in the M AZs is normal, as described in the third form described in S502.

When a network between the AZ 1 and the AZ 2 is abnormal but the network between the AZ 1 and the AZ 3 is normal, it indicates that a network connection between the AZ 1 and the AZ 2 may be faulty (for example, a network cable or an optical fiber between the AZ 1 and the AZ 2 is disconnected). In this case, both a primary node in the AZ 1 and a primary node in the AZ 2 can continue to provide services. However, because the AZ 1 and the AZ 2 cannot communicate with each other, the arbitration module may be needed to perform primary/secondary arbitration between the AZs.

Optionally, the arbitration module may determine, based on the application architecture information of the user included in the AZ 1 that is obtained from the cloud service control center, applications of which users are included in the AZ 1, and determine whether an application of a same user exists in the AZ 2 and the AZ 1. If an application of a first user exists in both the AZ 1 and the AZ 2, and nodes of the application of the first user exist only in the AZ 1 and the AZ 2, the arbitration module may further determine whether primary nodes of at least two services of the application of the first user are located in a same AZ. If the primary nodes of the at least two services are located in the same AZ, AZ arbitration is not performed. If the primary nodes of the at least two services are respectively located in the AZ 1 and the AZ 2, the arbitration module may further obtain priorities of the at least two services based on an arbitration policy configured by the user, and determine a primary AZ of the application of the first user based on the priorities. For example, the application of the first user includes a first service and a second service, the AZ 1 includes a primary node of the first service, and the AZ 2 includes a primary node of the second service. Correspondingly, the AZ 1 includes a secondary node of the second service, and the AZ 2 includes a secondary node of the first service. The arbitration module may obtain a priority of an AZ of the first service and a priority of an AZ of the second service. If the priority of the AZ of the first service indicates that a priority of the AZ 1 is higher than a priority of the AZ 2, and the priority of the AZ of the second service indicates that the priority of the AZ 1 is higher than the priority of the AZ 2, it is determined that the AZ 1 is a primary AZ of the first service and the second service, in other words, it is determined that the AZ 1 is the primary AZ of the application of the first user. If the nodes of the application of the first user further exist in an AZ other than the AZ 1 and the AZ 2, the AZ 1 and the AZ 2 may communicate with each other through the AZ. In this case, AZ arbitration does not need to be performed.

In some embodiments, after performing primary/secondary arbitration between the AZs, the arbitration module may send an arbitration result to the cloud service control center, and the cloud service control center may adjust a state of a node in each AZ based on the arbitration result. For example, the arbitration result indicates that a node 1 of a service 1 in the AZ 1 is adjusted to a primary node of the service 1, and the cloud service control center adjusts the node 1 in the AZ 1 to the primary node based on the arbitration result.

The arbitration module may determine, from the M AZs based on the detection information from the detection module, the AZ in which the primary node in each service included in the application of the user is located and the AZ in which the secondary node is located, to implement system-level arbitration on the M AZs, so that a probability of split-brain between the AZs can be reduced. The arbitration module can refer, during arbitration, to the arbitration policy configured by the user. This improves availability of the application of the user. In addition, in the technical solutions provided in embodiments of this application, a bandwidth resource does not need to be reserved, so that network costs are reduced.

The following describes two embodiments. The two embodiments are two examples of the multi-AZ arbitration method described in the embodiment shown in FIG. 5. In the two examples, a user constructs an application architecture of the user based on two AZs.

Embodiment 1

Figure 9:
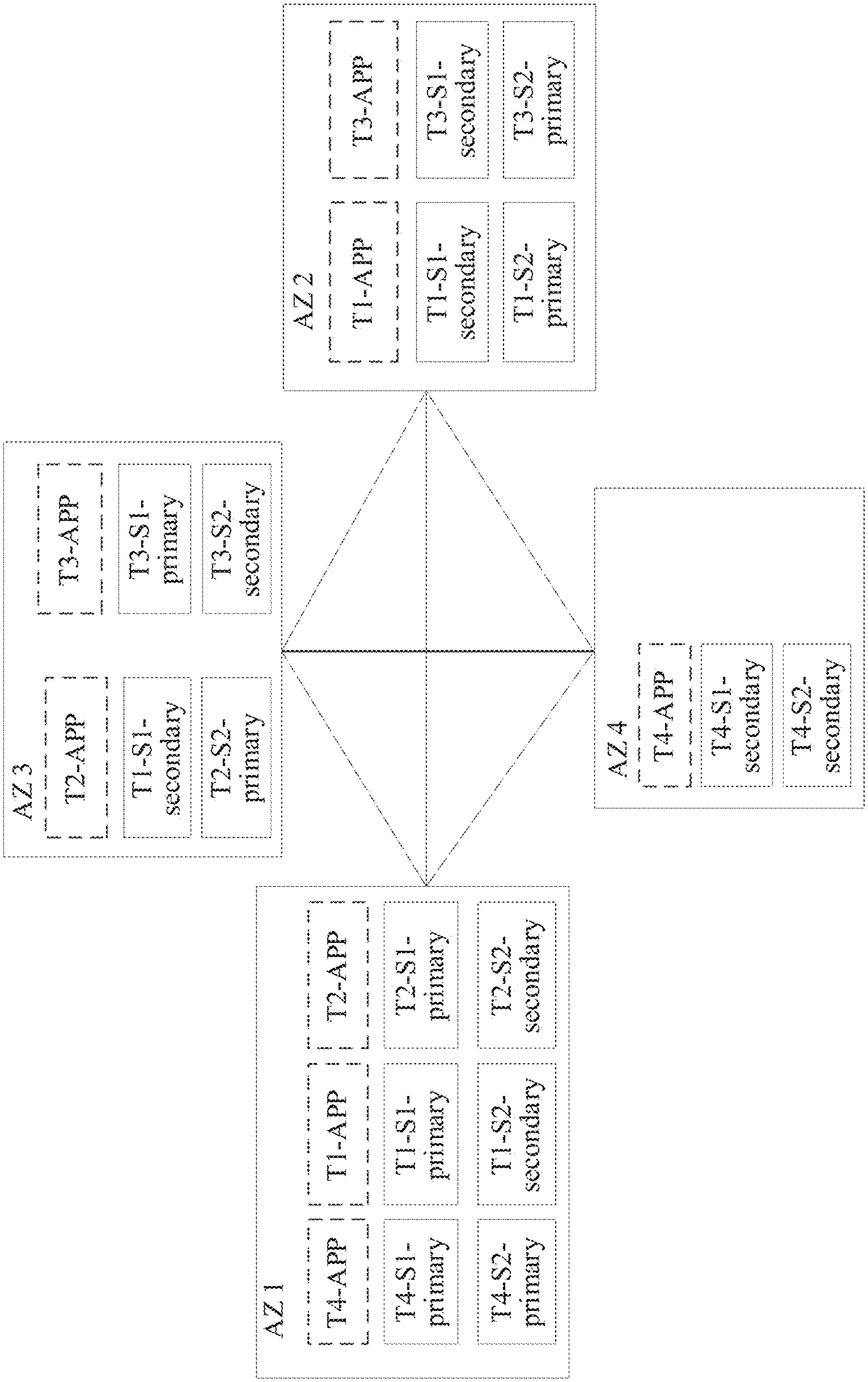

Refer to FIG. 9. A multi-AZ scenario shown in FIG. 9 includes four AZs: an AZ 1, an AZ 2, an AZ 3, and an AZ 4. The AZ 1 includes an application (T1-APP) of a tenant 1, an application (T2-APP) of a tenant 2, and an application (T4-APP) of a tenant 4. The AZ 2 includes the application (T1-APP) of the tenant 1 and an application (T3-APP) of a tenant 3. The AZ 3 includes the application (T2-APP) of the tenant 2 and the application (T3-APP) of the tenant 3, and the AZ 4 includes the application (T4-APP) of the tenant 4.

If the arbitration module determines, based on detection information reported by four detection modules, that network states between the four AZs are the states corresponding to Table 2. For example, the AZ 1 is isolated by the AZ 2, the AZ 3, and the AZ 4. The arbitration module determines, based on the application architecture information of the user obtained from the cloud service control center, that the AZ 2 and the AZ 1 include an application of a same tenant, that is, the application of the tenant 1, the AZ 3 and the AZ 1 include an application of a same tenant, that is, the application of the tenant 2, and the AZ 4 and the AZ 1 include an application of a same tenant, that is, the application of the tenant 4. For a result of primary/secondary arbitration performed by the arbitration module on the four AZs based on the network states between the AZs in Table 2 and application architecture information of the tenant, reference may be made to Table 5.

TABLE 5

| | AZ 1 | AZ 2 | AZ 3 | AZ 4 |
|---|---|---|---|---|
| AZ 1 | NG | The AZ 2 is a primary AZ of the application of the tenant 1 | The AZ 3 is a primary AZ of the application of the tenant 2 | The AZ 4 is a primary AZ of the application of the tenant 4 |
| AZ 2 | The AZ 2 is the primary AZ of the application of the tenant 1 | / | Normal | Normal |
| AZ 3 | The AZ 3 is the primary AZ of the application of the tenant 2 | Normal | / | Normal |
| AZ 4 | The AZ 4 is the primary AZ of the application of the tenant 4 | Normal | Normal | / |

If the arbitration module determines, based on detection information reported by four detection modules, that network states between the four AZs are the states corresponding to Table 3. For example, a network between the AZ 1 and the AZ 2 is faulty, networks between the AZ 1 and the AZ 3 and between the AZ 1 and the AZ 4 are normal, and networks between the AZ 2 and the AZ 3 and between the AZ 2 and the AZ 4 are normal. The arbitration module determines, based on the application architecture information of the user obtained from the cloud service control center, that the AZ 2 and the AZ 1 include an application of a same tenant, that is, the application of the tenant 1. For a result of primary/secondary arbitration performed by the arbitration module on the four AZs based on the network states between the AZs in Table 3 and application architecture information of the tenant, reference may be made to Table 6.

TABLE 6

| | AZ 1 | AZ 2 | AZ 3 | AZ 4 |
|---|---|---|---|---|
| AZ 1 | / | The AZ 2 is a primary AZ of the application of the tenant 1 | Normal | Normal |
| AZ 2 | The AZ 2 is the primary AZ of the application of the tenant 1 | / | Normal | Normal |
| AZ 3 | Normal | Normal | / | Normal |
| AZ 4 | Normal | Normal | Normal | / |

If the arbitration module determines, based on detection information reported by four detection modules, that network states between the four AZs are the states corresponding to Table 4. For example, networks between the AZ 1 and the AZ 2 and between the AZ 1 and the AZ 4 are faulty, networks between the AZ 3 and the AZ 2 and between the AZ 3 and the AZ 4 are faulty, a network between the AZ 1 and the AZ 3 is normal, and a network between the AZ 2 and the AZ 4 is normal. The arbitration module determines, based on the application architecture information of the user obtained from the cloud service control center, that the AZ 2 and the AZ 1 include an application of a same tenant, that is, the application of the tenant 1, the AZ 4 and the AZ 1 also include an application of a same tenant, that is, the application of the tenant 4, and the AZ 3 and the AZ 4 do not include an application of a same tenant. For a result of primary/secondary arbitration performed by the arbitration module on the four AZs based on the network states in Table 4 between the AZs and application architecture information of the tenant, reference may be made to Table 7.

TABLE 7

| | AZ 1 | AZ 2 | AZ 3 | AZ 4 |
|---|---|---|---|---|
| AZ 1 | / | The AZ 2 is a primary AZ of the application of the tenant 1 | Normal | The AZ 4 is a primary AZ of the application of the tenant 4 |
| AZ 2 | The AZ 2 is the primary AZ of the application of the tenant 1 | / | The AZ 3 is a primary AZ of the application of the tenant 3 | Normal |
| AZ 3 | Normal | The AZ 3 is the primary AZ of the application of the tenant 3 | / | Normal |
| AZ 4 | The AZ 4 is the primary AZ of the application of the tenant 4 | Normal | Normal | / |

Because the AZ 3 and the AZ 4 do not include the application of the same tenant, there is no need to perform primary/secondary arbitration between the AZ 3 and the AZ 4.

After the arbitration ends, the arbitration module may send the arbitration result to the cloud service control center shown in FIG. 3, and the cloud service control center may perform primary/secondary switchover on nodes in the AZs based on the arbitration result. The arbitration result in Table 6 is used as an example. The cloud service control center adjusts a node "T1-S1-secondary" in the AZ 2 to "T1-S1-primary", and adjusts a node "T1-S1-primary" in the AZ 1 to "T1-S1-secondary", where S refers to a service, and "T1-S1-secondary" represents a secondary node that provides a service 1 for the application of the tenant 1.

It may be understood that, when an AZ is determined as a primary AZ of an application of a user, it indicates that another AZ including a node corresponding to the application of the user is a secondary AZ of the application of the user. The arbitration result sent by the arbitration module to the cloud service control center may not indicate to downgrade the AZ to the secondary AZ of the application of the user.

In the foregoing embodiment, the arbitration module randomly determines the primary AZ and the secondary AZ from two AZs. In this way, the primary AZ can be determined in a timely manner, and performance check on a plurality of AZs is avoided. This helps improve arbitration efficiency of the arbitration module and improve arbitration flexibility of the arbitration module.

Embodiment 2

Still refer to FIG. 9. If the arbitration module determines, based on detection information reported by four detection modules, that network states between the four AZs are the states corresponding to Table 3. For example, a network between the AZ 1 and the AZ 2 is faulty, networks between the AZ 1 and the AZ 3 and between the AZ 1 and the AZ 4 are normal, and networks between the AZ 2 and the AZ 3 and between the AZ 2 and the AZ 4 are normal. The arbitration module determines, based on the application architecture information of the user obtained from the cloud service control center, that the AZ 2 and the AZ 1 include an application of a same tenant, that is, the application of the tenant 1. In addition, an AZ priority that is configured by the tenant 1 and that is obtained by the arbitration module from the cloud service control center is AZ 1>AZ 2. For a result of primary/secondary arbitration performed by the arbitration module on the four AZs based on the network states between the AZs in Table 3, an application architecture and an AZ priority of the tenant, reference may be made to Table 8.

TABLE 8

| | AZ 1 | AZ 2 | AZ 3 | AZ 4 |
|---|---|---|---|---|
| AZ 1 | / | The AZ 1 is a primary AZ of the application of the tenant 1 | Normal | Normal |
| AZ 2 | The AZ 1 is the primary AZ of the application of the tenant 1 | / | Normal | Normal |
| AZ 3 | Normal | Normal | / | Normal |
| AZ 4 | Normal | Normal | Normal | / |

If the arbitration module determines, based on detection information reported by four detection modules, that network states between the four AZs are the states corresponding to Table 4. For example, networks between the AZ 1 and the AZ 2 and between the AZ 1 and the AZ 4 are faulty, networks between the AZ 3 and the AZ 2 and between the AZ 3 and the AZ 4 are faulty, a network between the AZ 1 and the AZ 3 is normal, and a network between the AZ 2 and the AZ 4 is normal. The arbitration module determines, based on the application architecture information of the user obtained from the cloud service control center, that the AZ 2 and the AZ 1 include an application of a same tenant, that is, the application of the tenant 1, the AZ 4 and the AZ 1 include an application of a same tenant, that is, the application of the tenant 4, and the AZ 3 and the AZ 4 do not include an application of a same tenant. In addition, an AZ priority that is configured by the tenant 1 and that is obtained by the arbitration module from the cloud service control center is AZ 1>AZ 2, an AZ priority configured by the tenant 3 is AZ 2>AZ 3, and an AZ priority configured by the tenant 4 is AZ 4>AZ 1. For a result of primary/secondary arbitration performed by the arbitration module on the four AZs based on the network states between the AZs in Table 4, an application architecture and an AZ priority of the tenant, reference may be made to Table 9.

TABLE 9

| | AZ 1 | AZ 2 | AZ 3 | AZ 4 |
|---|---|---|---|---|
| AZ 1 | / | The AZ 1 is a primary AZ of the application of the tenant 1 | Normal | The AZ 4 is a primary AZ of the application of the tenant 4 |
| AZ 2 | The AZ 1 is the primary AZ of the application of the tenant 1 | / | The AZ 2 is a primary AZ of the application of the tenant 3 | Normal |
| AZ 3 | Normal | The AZ 2 is the primary AZ of the application of the tenant 3 | / | Normal |
| AZ 4 | The AZ 4 is the primary AZ of the application of the tenant 4 | Normal | Normal | / |

Because the AZ 3 and the AZ 4 do not include the application of the same tenant, there is no need to perform primary/secondary arbitration between the AZ 3 and the AZ 4.

After the arbitration ends, the arbitration module may send the arbitration result to the cloud service control center shown in FIG. 3, and the cloud service control center may perform primary/secondary switchover on nodes in the AZs based on the arbitration result. The arbitration result in Table 8 is used as an example. The cloud service control center adjusts a node “T1-S2-secondary” in the AZ 1 to “T1-S2-primary”, and adjusts a node “T1-S2-primary” in the AZ 2 to “T1-S2-secondary”.

It may be understood that, when an AZ is determined as a primary AZ of an application of a user, it indicates that another AZ including a node corresponding to the application of the user is a secondary AZ of the application of the user. The arbitration result sent by the arbitration module to the cloud service control center may not indicate to downgrade the AZ to the secondary AZ of the application of the user.

In the foregoing embodiment, the arbitration module determines the primary AZ based on the AZ priority configured by the tenant, so that the determined primary AZ better meets a requirement of the tenant, to help improve tenant experience.

With reference to the foregoing method embodiments, an embodiment of this application further provides an arbitration apparatus and a detection apparatus. The arbitration apparatus is configured to perform the method performed by the arbitration module (for example, a server) in the foregoing method embodiments, and the detection apparatus is configured to perform the method performed by the detection module (for example, a server) in the foregoing method embodiments.

Figure 10:
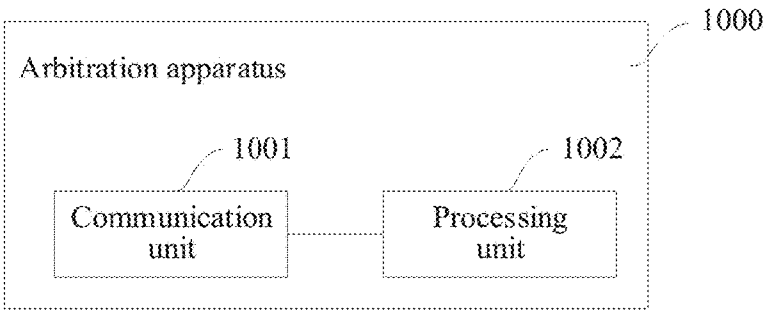
FIG. 10 is a block diagram of a structure of a multi-AZ arbitration apparatus according to an embodiment of this application.

As shown in FIG. 10, an arbitration apparatus 1000 includes: a communication unit 1001, configured to receive M pieces of detection information from M detection modules, where first detection information in the M pieces of detection information is from a first detection module in the M detection modules, the first detection information indicates a status of receiving and/or sending data by the first detection module, the M detection modules are located in M AZs, and one AZ includes one detection module; and a processing unit 1002, configured to determine network states between the M AZs based on the M pieces of detection information, and further configured to determine a primary AZ and a secondary AZ from the M AZs based on the network states.

In a possible implementation, the network states between the M AZs include that networks between a first AZ in the M AZs and remaining M−1 AZs in the M AZs are all faulty; or a network between a first AZ in the M AZs and a second AZ in the M AZs is faulty, and a network between the first AZ and a third AZ in the M AZs is normal.

In a possible implementation, the network states include that the networks between the first AZ in the M AZs and the remaining M−1 AZs in the M AZs are all faulty. The processing unit 1002 is configured to determine N AZs from the M−1 AZs, where an application of a first user exists in each of the first AZ and the N AZs, and N is a positive integer; and determine that a fourth AZ in the N AZs is a primary AZ of the application of the first user, and the first AZ and remaining N−1 AZs in the N AZs are secondary AZs of the application of the first user.

In a possible implementation, the processing unit 1002 is configured to randomly determine that the fourth AZ is the primary AZ of the application of the first user, and the first AZ and the N−1 AZs are the secondary AZs of the application of the first user; or determine, based on priorities, that the fourth AZ is the primary AZ of the application of the first user, and the first AZ and the N−1 AZs are the secondary AZs of the application of the first user, where a priority of the fourth AZ is higher than priorities of the N−1 AZs.

In a possible implementation, the network states include that the network between the first AZ in the M AZs and the second AZ in the M AZs is faulty, and the network between the first AZ and the third AZ in the M AZs is normal. The processing unit 1002 is configured to determine that the first AZ is a primary AZ of an application of a second user, and the second AZ and K AZs are secondary AZs of the application of the second user, where the application of the second user exists in each of the first AZ, the second AZ, and the K AZs, and K is an integer greater than or equal to 0.

In a possible implementation, the processing unit 1002 is configured to randomly determine that the first AZ is the primary AZ of the application of the second user, and the second AZ and the K AZs are the secondary AZs of the application of the second user; or determine, based on priorities, that the first AZ is the primary AZ of the application of the second user, and the second AZ and the K AZs are the secondary AZs of the application of the second user, where a priority of the first AZ is higher than priorities of the second AZ and the K AZs.

Figure 11:
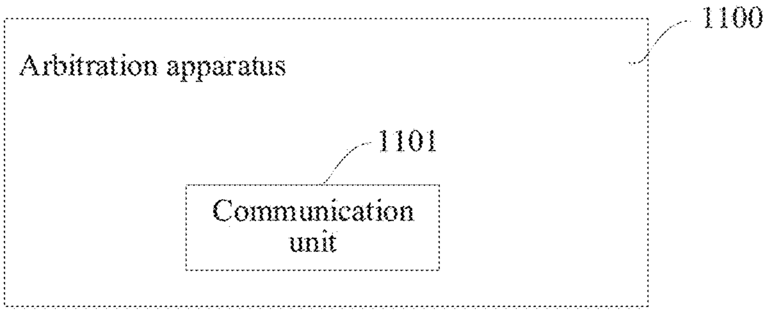
FIG. 11 is a block diagram of a structure of another multi-AZ arbitration apparatus according to an embodiment of this application.

As shown in FIG. 11, a detection apparatus 1100 may be a detection module, including: a communication unit 1101, configured to send detection information to M−1 detection modules in M detection modules except a first detection module, and receive detection information from at least one detection module in the M−1 detection modules, where the M detection modules are located in M AZs, one AZ includes one detection module, and M is an integer greater than 2, and further configured to send first detection information to the arbitration module, where the first detection information includes the detection information from the at least one detection module.

This application further provides an arbitration system. As shown in FIG. 11, the arbitration system includes an arbitration module and M detection modules, where M is an integer greater than 2. A first detection module in the M detection modules is configured to send detection information to M−1 detection modules in the M detection modules except the first detection module, and receive at least one piece of detection information from at least one detection module in the M−1 detection modules, where the M detection modules are located in M AZs, and one AZ includes one detection module. The first detection module is further configured to send first detection information to the arbitration module, where the first detection information includes the detection information from the at least one detection module. The arbitration module is configured to receive M pieces of detection information from the M detection modules, where the M pieces of detection information include the first detection information. The arbitration module is further configured to determine network states between the M AZs based on the M pieces of detection information. The arbitration module is further configured to determine a primary AZ and a secondary AZ from the M AZs based on the network states.

The detection module, the arbitration module, the processing unit, and the communication unit may all be implemented by using software, or may be implemented by using hardware. For example, the following describes an implementation of the arbitration module. Similarly, for implementations of the processing unit and the communication unit, reference may be made to the implementation of the arbitration module.

The module is used as an example of a software functional unit, and the arbitration module may include code being run on a computing instance. The computing instance may be at least one of computing devices such as a physical host (computing device), a virtual machine, and a container. Further, there may be one or more computing devices. For example, the arbitration module may include code being run on a plurality of hosts/virtual machines/containers. It should be noted that the plurality of hosts/virtual machines/containers used to run the code may be distributed in a same region or may be distributed in different regions. The plurality of hosts/virtual machines/containers used to run the code may be distributed in a same AZ, or may be distributed in different AZs. Each AZ includes one data center or a plurality of data centers that are geographically close to each other. Generally, one region may include a plurality of AZs.

Similarly, the plurality of hosts/virtual machines/containers used to run the code may be distributed in a same VPC, or may be distributed in a plurality of VPCs. Generally, one VPC is disposed in one region. A communication gateway may need to be provided in each VPC for communication between two VPCs in a same region or between VPCs in different regions. Interconnection between VPCs is implemented through the communication gateway.

The module is used as an example of a hardware functional unit, and the arbitration module may include at least one computing device, for example, a server. Alternatively, the arbitration module may be a device implemented by using an application-specific integrated circuit (ASIC) or a programmable logic device (PLD), or the like. The PLD may be implemented by a complex programmable logic device (CPLD), a field-programmable gate array (FPGA), a generic array logic (GAL), or any combination thereof.

A plurality of computing devices included in the arbitration module may be distributed in the same region, or may be distributed in different regions. The plurality of computing devices included in the arbitration module may be distributed in the same AZ, or may be distributed in different AZs. Similarly, the plurality of computing devices included in the arbitration module may be distributed in the same VPC, or may be distributed in the plurality of VPCs. The plurality of computing devices may be any combination of computing devices such as the server, the ASIC, the PLD, the CPLD, the FPGA, and the GAL.

Figure 12:
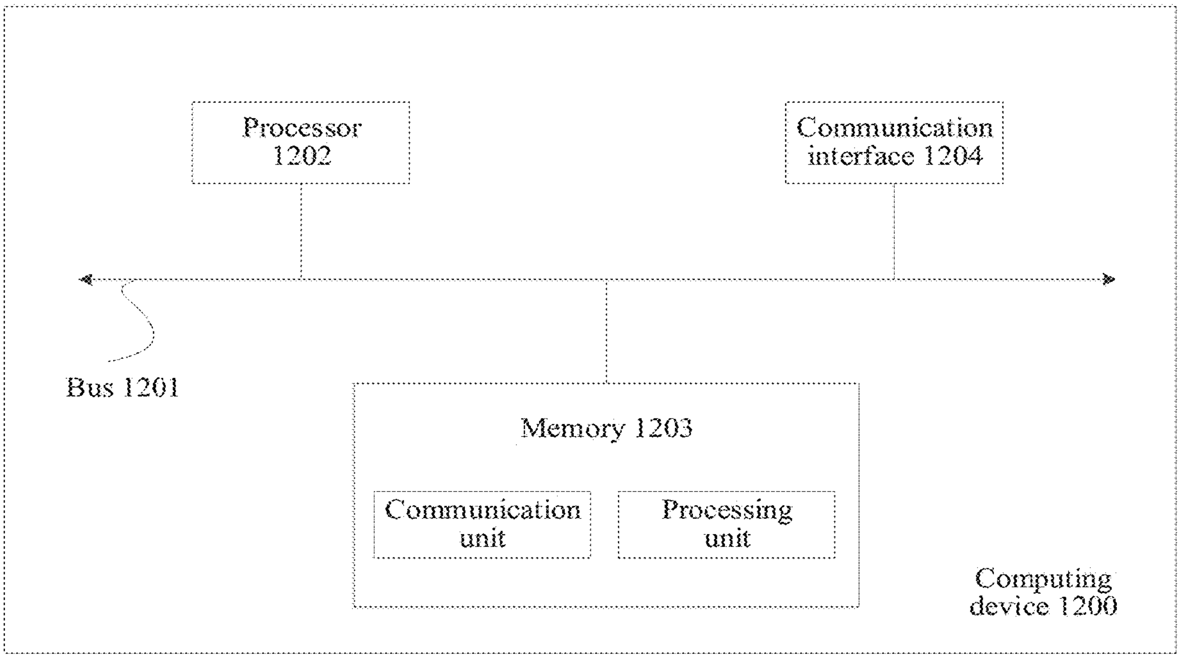
FIG. 12 shows a computing device according to an embodiment of this application.

This application further provides a computing device 1200. As shown in FIG. 12, the computing device 1200 includes a bus 1201, a processor 1202, a memory 1203, and a communication interface 1204. The processor 1202, the memory 1203, and the communication interface 1204 communicate with each other through the bus 1201. The computing device 1200 may be a server or a terminal device. It should be understood that quantities of processors and memories in the computing device 1200 are not limited in this application.

The bus 1201 may be a Peripheral Component Interconnect (PCI) bus, an Extended Industry Standard Architecture (EISA) bus, or the like. The bus may be classified into an address bus, a data bus, a control bus, and the like. For ease of representation, the bus is represented by using only one line in FIG. 12. However, this does not indicate that there is only one bus or only one type of bus. The bus 1201 may include a path for transferring information between various components (for example, the memory 1203, the processor 1202, and the communication interface 1204) of the computing device 1200.

The processor 1202 may include any one or more of processors, such as a central processing unit (CPU), a graphics processing unit (GPU), a microprocessor (MP), or a digital signal processor (DSP).

The memory 1203 may include a volatile memory, for example, a random-access memory (RAM). The processor 1202 may further include a non-volatile memory, for example, a read-only memory (ROM), a flash memory, a hard disk drive (HDD), or a solid-state drive (SSD).

The memory 1203 stores executable program code, and the processor 1202 executes the executable program code to separately implement functions of the foregoing communication unit 1001 and processing unit 1002, so as to implement a multi-AZ arbitration method. In other words, the memory 1203 stores instructions for performing the multi-AZ arbitration method.

Alternatively, the memory 1203 stores executable code, and the processor 1202 executes the executable code to separately implement functions of the foregoing arbitration module and detection module, so as to implement the multi-AZ arbitration method. In other words, the memory 1203 stores instructions for performing the multi-AZ arbitration method.

The communication interface 1204 uses a transceiver module, for example, but not limited to, a network interface card or a transceiver, to implement communication between the computing device 1200 and another device or a communication network.

An embodiment of this application further provides a computing device cluster. The computing device cluster includes at least one computing device. The computing device may be a server, for example, a central server, an edge server, or a local server in a local data center. In some embodiments, the computing device may alternatively be a terminal device, for example, a desktop computer, a notebook computer, or a smartphone.

Figure 13:
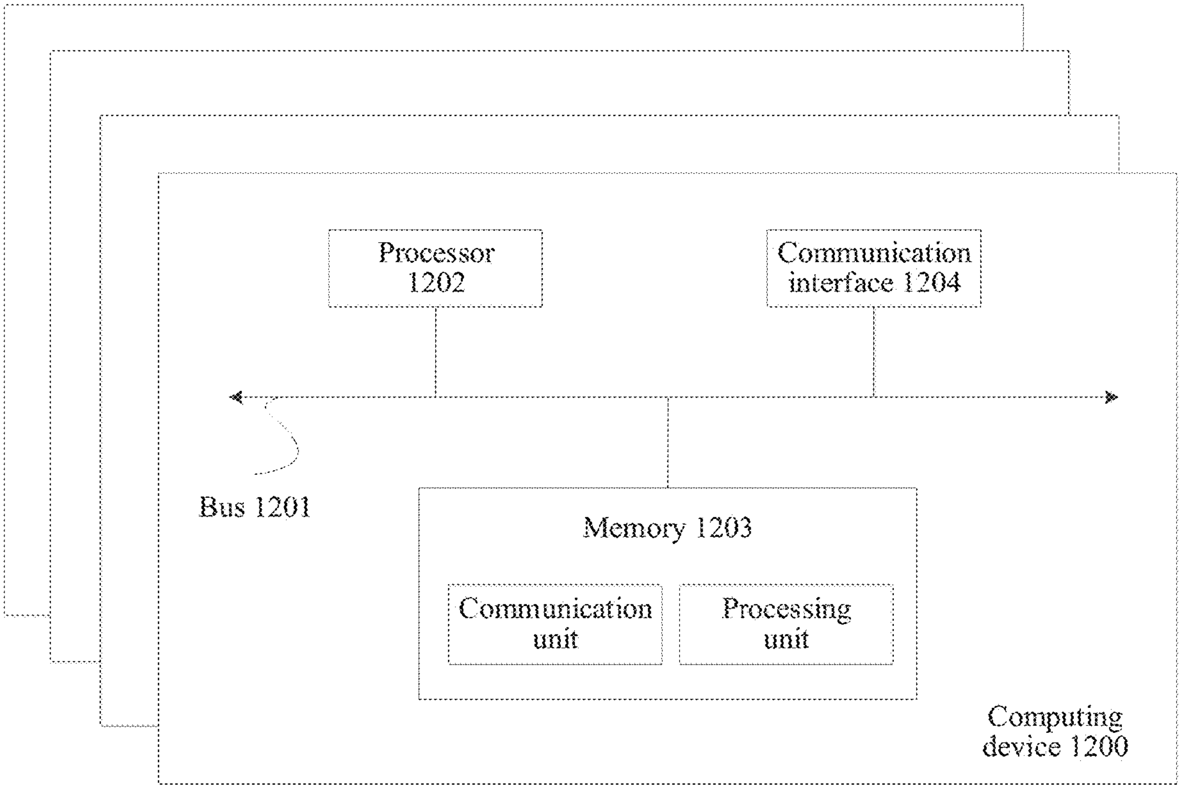
FIG. 13 shows a computing device cluster according to an embodiment of this application.

As shown in FIG. 13, the computing device cluster includes at least one computing device 1200. Memories 1203 in one or more computing devices 1200 in the computing device cluster may store same instructions that are used for performing the multi-AZ arbitration method.

In some possible implementations, the memories 1203 in the one or more computing devices 1200 in the computing device cluster may alternatively respectively store some instructions for performing the multi-AZ arbitration method. In other words, a combination of the one or more computing devices 1200 may jointly execute the instructions for performing the multi-AZ arbitration method.

It should be noted that memories 1203 in different computing devices 1200 in the computing device cluster may store different instructions respectively used for performing some functions of an arbitration module. In other words, the instructions stored in the memories 1203 in different computing devices 1200 may implement functions of one or more of a detection module, a communication unit, and a processing unit.

Figure 14:
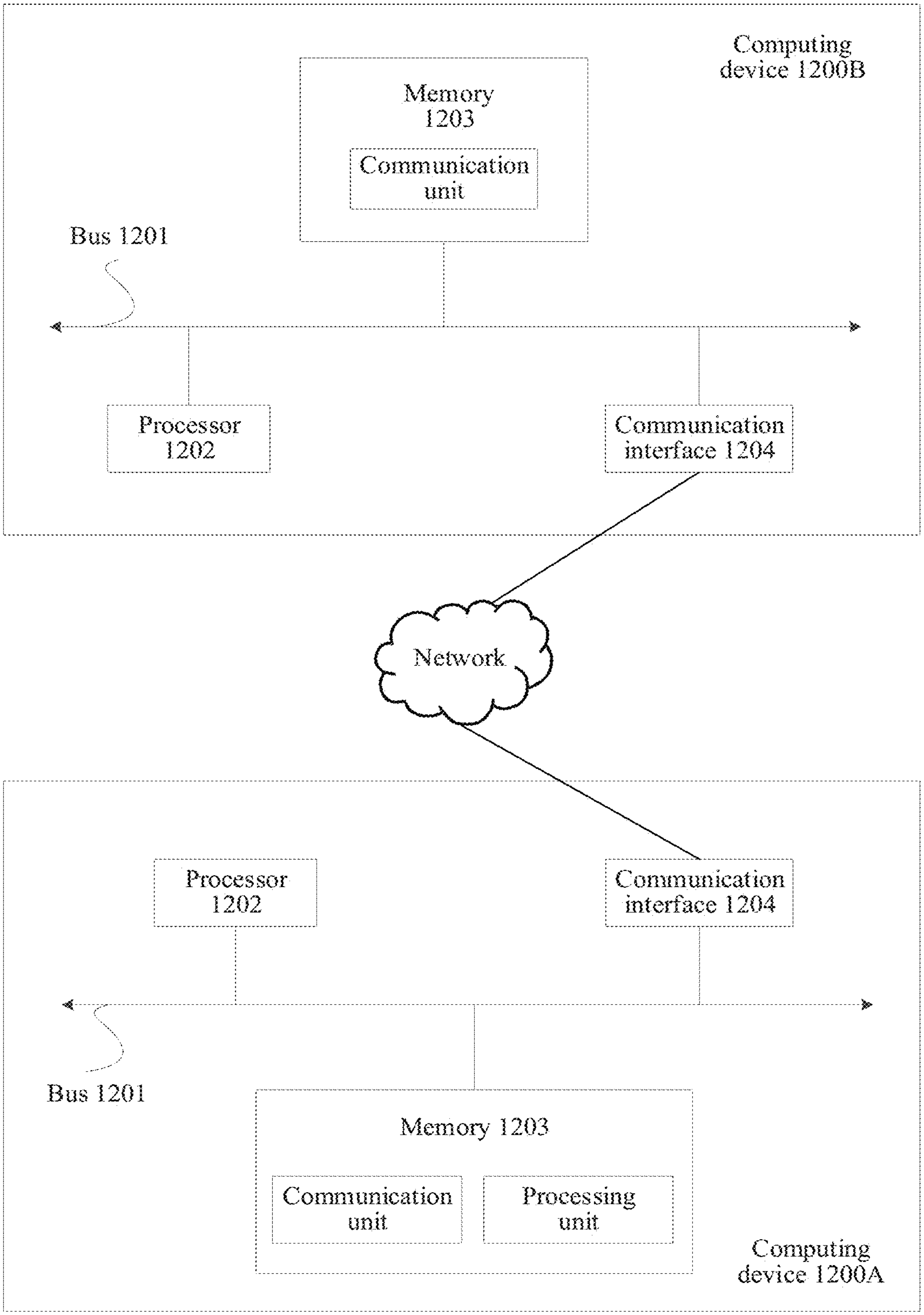
FIG. 14 shows another computing device cluster according to an embodiment of this application.

In some possible implementations, the one or more computing devices in the computing device cluster may be connected via a network. The network may be a wide area network, a local area network, or the like. FIG. 14 shows a possible implementation. As shown in FIG. 14, two computing devices 1200A and 1200B are connected via a network. Each computing device is connected to the network through a communication interface of the computing device. In this type of possible implementation, a memory 1203 in the computing device 1200A stores instructions for performing a function of an arbitration module. In addition, a memory 1203 in the computing device 1200B stores instructions for performing a function of a detection module.

It should be understood that functions of the computing device 1200A shown in FIG. 14 may alternatively be completed by a plurality of computing devices 1200. Similarly, functions of the computing device 1200B may alternatively be completed by the plurality of computing devices 1200.

An embodiment of this application further provides another computing device cluster. For a connection relationship between computing devices in the computing device cluster, refer to the connection manners of the computing device cluster in FIG. 13 and FIG. 14 similarly. A difference lies in that memories 1203 in one or more computing devices 1200 in the computing device cluster may store same instructions for performing the multi-AZ arbitration method.

In some possible implementations, the memories 1203 in the one or more computing devices 1200 in the computing device cluster may alternatively respectively store some instructions for performing the multi-AZ arbitration method. In other words, a combination of the one or more computing devices 1200 may jointly execute the instructions for performing the multi-AZ arbitration method.

It should be noted that memories 1203 in different computing devices 1200 in the computing device cluster may store different instructions for performing some functions of an arbitration system. In other words, the instructions stored in the memories 1203 in different computing devices 1200 may implement functions of one or more apparatuses in the arbitration module and the detection module.

An embodiment of this application further provides a computer program product including instructions. The computer program product may be software or a program product that includes instructions and that can run on a computing device or be stored in any usable medium. When the computer program product is run on at least one computing device, the at least one computing device is enabled to perform the multi-AZ arbitration method.

Embodiments of this application further provide a computer-readable storage medium. The computer-readable storage medium may be any usable medium that can be stored by a computing device, or a data storage device, such as a data center, including one or more usable media. The usable medium may be a magnetic medium (for example, a floppy disk, a hard disk drive, or a magnetic tape), an optical medium (for example, a digital versatile disc (DVD)), a semiconductor medium (for example, a solid-state drive), or the like. The computer-readable storage medium includes instructions. The instructions instruct a computing device to perform the multi-AZ arbitration method.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of the present disclosure.

The invention claimed is:

1. A method, applied to an arbitration apparatus, and comprising:

receiving an arbitration policy configured by a user;

receiving, from each detection apparatus of M detection apparatuses corresponding to M multi-availability zone (AZs) detection information indicating a status of the detection apparatus, wherein the status is at least one of receiving or sending data, and wherein M is an integer greater than 2;

determining network states between the M AZs based on the detection information, wherein at least one application is running in the M AZs, wherein the M AZs provide at least one service for each of the at least one application, wherein each of the at least one service is provided by a primary node and a secondary node, and wherein the primary node and the secondary node deployed in different AZs of the M AZs;

determining, based on the network states and the arbitration policy, a first plurality of AZs in which at least one primary node is located; and determining, based on the network states and the arbitration policy, a second plurality of AZs in which at least one secondary node is located.

2. The method according to claim 1, wherein a first primary node that provides a first service for an application of the user exists in a first AZ, wherein when the network states indicate that networks between the first AZ in the M AZs and remaining AZs in the M AZs are all faulty, determining the first plurality of AZs and determining the second plurality of AZs comprises:

determining N AZs from the remaining AZs, wherein a first secondary node of the first service exists in each of the N AZs, and wherein N is a positive integer; and upgrading, based on a priority that is of an AZ of the first service and that is comprised in the arbitration policy, a second AZ in the N AZs to a primary AZ of the first service.

3. The method according to claim 1, wherein when the network states indicate that a first network between a first AZ in the M AZs and a second AZ in the M AZs is faulty, and when a second network between the first AZ and a third AZ in the M AZs is normal, determining the first plurality of AZs and determining the second plurality of AZs comprises:

determining a first application of a first user exists, wherein a first primary node that provides a first service for the first application exists in the first AZ, a second primary node that provides a second service for second application of a second user exists in the second AZ, and no node of the first application exists in an AZ other than the first AZ and the second AZ in the M AZs; and determining that the first AZ is a primary AZ of the first service and the second service, wherein the arbitration policy comprises:

a first service priority that is of a first service AZ of the first service, wherein the first service priority indicates that a first priority of the first AZ is higher than a second priority of the second AZ; and a second service priority that is of a second service AZ of the second service, wherein the second service priority indicates that the first priority is higher than the second priority.

4. The method according to claim 1, wherein when the network states indicate that a first network between a first AZ in the M AZs and a second AZ in the M AZs is faulty, and when a second network between the first AZ and at least one AZ in the M AZs is normal, determining the first plurality of AZs and determining the second plurality of AZs comprises:

determining a first application of a third user exists, wherein a first primary node that provides a first service for the first application exists in the first AZ, a second primary node that provides a second service for a second application of a forth user exists in the second AZ, and no node of the first application exists in an AZ other than the first AZ and the second AZ in the M AZs; and randomly determining the first AZ or the second AZ as a primary AZ of the first service and the second service, wherein the arbitration policy comprises:

a first service priority that is of a first service AZ of the first service, wherein the first service priority indicates that a first priority of the first AZ is higher than a second priority of the second AZ; and a second service priority that is of a second service AZ of the second service, wherein the second service priority indicates that the second priority is higher than the first priority.

5. The method according to claim 1, wherein the detection information comprises heartbeat packets, and wherein determining the network states based on the detection information comprises:

determining a quantity of the heartbeat packets in the detection information; and determining the network states based on the quantity of the heartbeat packets.

6. The method according to claim 5, wherein the detection information of each detection apparatus comprises a first quantity of first heartbeat packets sent by the detection apparatus and a second quantity of second heartbeat packets received by the detection apparatus, wherein the first quantity being the same as the second quantity indicates that networks between a first AZ and remaining AZs in the M AZs are normal, and wherein the first quantity being different from the second quantity indicates that at least one network between the first AZ in the remaining AZs is faulty.

7. The method according to claim 5, wherein the detection information further comprises at least one of a transmission time of each of the heartbeat packets or a transmission path of each of the heartbeat packets.

8. A multi-availability zone (AZ) arbitration system comprising:

M AZs, wherein each of the M AZs comprises a detection apparatus and a plurality of service nodes, and wherein M is an integer greater than 2; and an arbitration apparatus comprising:

a memory is configured to store instructions; and one or more processors coupled to the memory and configured to execute the instructions cause the arbitration apparatus to:

receive an arbitration policy configured by a user;

receive, from each detection apparatus of M detection apparatuses corresponding to the M AZs, detection information indicating priorities of AZs that provide each service for an application of the user and further indicating a status of the detection apparatus, wherein the status is at least one of receiving or sending data, and wherein M is an integer greater than 2;

determine network states between the M AZs based on the detection information, wherein at least one application is running in the M AZs, wherein the M AZs provide at least one service for each of the at least one application, wherein each of the at least one service is provided by a primary node and a secondary node, and wherein the primary node and the secondary node are deployed in different AZs of the M AZs;

determine, based on the network states and the arbitration policy, a first plurality of AZs in which at least one primary node is located; and determine, based on the network states and the arbitration policy, a second plurality of AZs in which at least one secondary node is located.

9. The AZ arbitration system according to claim 8, wherein a first primary node that provides a first service for the application of the user exists in the first AZ, wherein when the network states indicate that networks between the first AZ in the M AZs and remaining AZs in the M AZs are all faulty, the one or more processors are further configured to execute the instructions to cause the arbitration apparatus to determine the first plurality of AZs and determine the second plurality of AZs by:

determining N AZs from the remaining AZs, wherein a first secondary node of the first service exists in each of the N AZs, and wherein N is a positive integer; and upgrading, based on a priority that is of an AZ of the first service and that is comprised in the arbitration policy, a second AZ in the N AZs to a primary AZ of the first service.

10. The AZ arbitration system arbitration according to claim 8, wherein when the network states indicate that a first network between a first AZ in the M AZs and a second AZ in the M AZs is faulty, and when a second network between the first AZ and a third AZ in the M AZs is normal, the one or more processors are further configured to execute the instructions to cause the arbitration apparatus to determine the first plurality of AZs and determine the second plurality of AZs by:

determining a first application of a first user exists, wherein a first primary node that provides a first service for the first application exists in the first AZ, a second primary node that provides a second service for a second application of a second user exists in the second AZ, and no node of the first application of exists in an AZ other than the first AZ and the second AZ in the M AZs; and determining that the first AZ is a primary AZ of the first service and the second service, wherein the arbitration policy comprises:

a first service priority that is of a first service AZ of the first service, wherein the first service priority indicates that a first priority of the first AZ is higher than a second priority of the second AZ; and a second service priority that is of a second service AZ of the second service, wherein the second service priority indicates that the first priority is higher than the second priority.

11. The AZ arbitration system according to claim 8, wherein when the network states indicate that a first network between a first AZ in the M AZs and a second AZ in the M AZs is faulty, and when a second network between the first AZ and at least one AZ in the M AZs is normal, the one or more processors are further configured to execute the instructions to cause the arbitration apparatus to:

determine a first application of a first user exists, wherein a first primary node that provides a first service for the first application exists in the first AZ, a second primary node that provides a second service for a second application of a second user exists in the second AZ, and no node of the first application exists in an AZ other than the first AZ and the second AZ in the M AZs; and randomly determine the first AZ or the second AZ as a primary AZ of the first service and the second service, wherein the arbitration policy comprises;

a first service priority that is of a first service AZ of the first service, wherein the first service priority indicates that a first priority of the first AZ is higher than a second priority of the second AZ; and a second service priority that is of a second service AZ of the second service, wherein the second service priority indicates that the second priority is higher than the first priority.

12. The AZ arbitration system according to claim 8, wherein the detection information comprises heartbeat packets, and wherein the one or more processors are further configured to execute the instructions to cause the arbitration apparatus to determine the network states based on the detection information by:

determining a quantity of the heartbeat packets in the detection information; and determining the network states based on the quantity of the heartbeat packets.

13. The AZ arbitration system according to claim 12, wherein the detection information of each detection apparatus comprises a first quantity of first heartbeat packets sent by the detection apparatus and a second quantity of second heartbeat packets received by the detection apparatus, wherein the first quantity being the same as the second quantity indicates that networks between a first AZ and remaining AZs in the M AZs are normal, and wherein the first quantity being different from the second quantity indicates that at least one network between the first AZ in the remaining AZs is faulty.

14. The AZ arbitration system according to claim 12, wherein the detection information further comprises at least one of a transmission time of each of the heartbeat packets or a transmission path of each of the heartbeat packets.

15. A computer program product comprising instructions that are stored on a non-transitory computer-readable medium and that, when executed by one or more processors, cause a multi-availability zone (AZ) arbitration system to:

receive an arbitration policy configured by a user;

receive, from each detection apparatus of M detection apparatuses corresponding to M AZs, detection information indicating priorities of AZs that provide each service for an application of the user, wherein the detection information indicates a status of the detection apparatus, wherein the status is at least one of receiving or sending data, wherein the multi-AZ arbitration system comprises M AZs and an arbitration apparatus, and wherein M is an integer greater than 2;

determine network states between the M AZs based on the detection information, wherein at least one application running in the M AZs wherein the M AZs provide at least one service for each application, wherein each of the at least one service is provided by a primary node and a secondary node, and wherein the primary node and the secondary node in each service are deployed in different AZs;

determine, based on the network states and the arbitration policy, a first plurality of AZs in which at least one primary node is located; and determine, based on the network states and the arbitration policy, a second plurality of AZs in which at least one secondary node is located.

16. The computer program product according to claim 15, wherein a first primary node that provides a first service for the application of the user exists in the first AZ, wherein when the network states indicate that networks between the first AZ in the M AZs and remaining AZs in the M AZs are all faulty, when the one or more processors are further configured to execute the instructions to cause the multi-AZ arbitration system to determine the first plurality of AZs and determine the second plurality of AZs by:

determining N AZs from the remaining AZs, wherein a first secondary node of the first service exists in each of the N AZs, and wherein N is a positive integer; and upgrading, based on a priority that is of an AZ of the first service and that is comprised in the arbitration policy, a second AZ in the N AZs to a primary AZ of the first service.

17. The computer program product according to claim 15, wherein when the network states indicate that a first network between a first AZ in the M AZs and a second AZ in the M AZs is faulty, and when a second network between the first AZ and a third AZ in the M AZs is normal, when the one or more processors are further configured to execute the instructions to cause the multi-AZ arbitration system to determine the first plurality of AZs and determine the second plurality of AZs by:

determining a first application of a first user exists, wherein a first primary node that provides a first service for the first application exists in the first AZ, a second primary node that provides a second service for a second application of a second user exists in the second AZ, and no node of the first application exists in an AZ other than the first AZ and the second AZ in the M AZs; and determining that the first AZ is a primary AZ of the first service and the second service, wherein the arbitration policy comprises:

a first service priority that is of a first service AZ of the first service, wherein the first service priority indicates that a first priority of the first AZ is higher than a second priority of the second AZ; and a second service priority that is of a second service AZ of the second service, wherein the second service priority indicates that the first priority is higher than the second priority.

18. The computer program product according to claim 15, wherein when the network states indicate that a first network between a first AZ in the M AZs and a second AZ in the M AZs is faulty, and when a second network between the first AZ and at least one in the M AZs is normal, the one or more processors are further configured to execute the instructions to cause the multi-AZ arbitration system to:

determine a first application of a first user exists, wherein a first primary node that provides a first service for the first application exists in the first AZ, a second primary node that provides a second service for a second application of a second user exists in the second AZ, and no node of the first application exists in an AZ other than the first AZ and the second AZ in the M AZs; and randomly determine the first AZ or the second AZ as a primary AZ of the first service and the second service, wherein the arbitration policy comprises:

a first service priority that is of an AZ of the first service, wherein the first service priority indicates that a first priority of the first AZ is higher than a second priority of the second AZ; and a second service priority that is of an AZ of the second service, wherein the second service priority indicates that the second priority is higher than the first priority.

19. The computer program product according to claim 15, wherein the detection information comprises heartbeat packets, and wherein the one or more processors are further configured to execute the instructions to cause the multi-AZ arbitration system to determine the network states based on the detection information by:

determining a quantity of the heartbeat packets in the detection information; and determining the network states based on the quantity of the heartbeat packets.

20. The computer program product according to claim 19, wherein the detection information of each detection apparatus comprises a first quantity of first heartbeat packets sent by the detection apparatus and a second quantity of second heartbeat packets received by the detection apparatus, wherein the first quantity being the same as the second quantity indicates that networks between a first AZ and remaining AZs in the M AZs are normal, and wherein the first quantity being different from the second quantity indicates that at least one network between the first AZ in the remaining AZs is faulty.

* * * * *